US008690057B2

(12) United States Patent
Schoening et al.

(10) Patent No.: US 8,690,057 B2
(45) Date of Patent: Apr. 8, 2014

(54) RADIO FREQUENCY IDENTIFICATION SYSTEM FOR TRACKING AND MANAGING MATERIALS IN A MANUFACTURING PROCESS

(71) Applicant: A-1 Packaging Solutions, Inc., St. Charles, IL (US)

(72) Inventors: Kenneth F. Schoening, St. Charles, IL (US); William J. Greaves, Indianhead Park, IL (US)

(73) Assignee: A-I Packaging Solutions, Inc., St. Charles, IL (US)

( * ) Notice: Subject to any disclaimer, the term of this patent is extended or adjusted under 35 U.S.C. 154(b) by 0 days.

(21) Appl. No.: 13/857,616

(22) Filed: Apr. 5, 2013

(65) Prior Publication Data

US 2013/0233922 A1 Sep. 12, 2013

Related U.S. Application Data

(63) Continuation of application No. PCT/US2013/029408, filed on Mar. 6, 2013.

(60) Provisional application No. 61/607,406, filed on Mar. 6, 2012, provisional application No. 61/708,518, filed on Oct. 1, 2012.

(51) Int. Cl.
*G07F 19/00* (2006.01)

(52) U.S. Cl.
USPC ................. 235/385; 340/10.41; 340/572.1

(58) Field of Classification Search
USPC ............................ 235/385; 340/10.41, 572.1
See application file for complete search history.

(56) References Cited

U.S. PATENT DOCUMENTS

| | | | |
|---|---|---|---|
| 5,832,814 | A | 11/1998 | Nakatani |
| 6,600,418 | B2 | 7/2003 | Francis et al. |
| 6,661,278 | B1 | 12/2003 | Gilliland |
| 6,664,909 | B1 | 12/2003 | Hyde et al. |
| 6,842,327 | B1 | 1/2005 | Diorio et al. |
| 6,853,583 | B2 | 2/2005 | Diorio et al. |
| 6,873,281 | B1 | 3/2005 | Esterberg et al. |
| 6,909,389 | B1 | 6/2005 | Hyde et al. |

(Continued)

FOREIGN PATENT DOCUMENTS

JP 2008-006516 1/2008

OTHER PUBLICATIONS

International Search Report and Written Opinion for Application No. PCT/US2013/029408, dated Jun. 26, 2013.

*Primary Examiner* — Allyson Trail
(74) *Attorney, Agent, or Firm* — Marshall, Gerstein & Borun LLP

(57) ABSTRACT

A process management system uses a radio frequency identification (RFID) detection system in the form of, for example, a phased array antenna based RFID detection system to track and manage material storage and flow in a manufacturing process or plant. The process management system operates in conjunction with the various machines that implement manufacturing stages or steps of the manufacturing process to assure that the correct materials and processing procedures are used at or on the various production machines of the process to produce a particular product as defined by a job number or job order. The process management system is thereby able to increase the efficiencies of the plant and to increase the quality of the plant production by reducing or eliminating waste, manufacturing errors and shipping errors in the production facility.

30 Claims, 7 Drawing Sheets

(56) References Cited

U.S. PATENT DOCUMENTS

| | | |
|---|---|---|
| 6,950,342 B2 | 9/2005 | Lindhorst et al. |
| 6,954,159 B1 | 10/2005 | Cooper et al. |
| 6,958,646 B1 | 10/2005 | Colleran et al. |
| 6,965,142 B2 | 11/2005 | Diorio et al. |
| 6,977,527 B1 | 12/2005 | Hyde |
| 7,026,935 B2 | 4/2006 | Diorio et al. |
| 7,030,786 B2 | 4/2006 | Kaplan et al. |
| 7,038,544 B2 | 5/2006 | Diorio et al. |
| 7,038,603 B2 | 5/2006 | Diorio et al. |
| 7,042,701 B2 | 5/2006 | Diorio et al. |
| 7,049,872 B2 | 5/2006 | Diorio et al. |
| 7,049,964 B2 | 5/2006 | Hyde et al. |
| 7,061,324 B2 | 6/2006 | Diorio et al. |
| 7,071,507 B2 | 7/2006 | Diorio et al. |
| 7,102,438 B1 | 9/2006 | Colleran et al. |
| 7,107,022 B1 | 9/2006 | Thomas et al. |
| 7,116,240 B2 | 10/2006 | Hyde |
| 7,120,550 B2 | 10/2006 | Diorio et al. |
| 7,123,171 B2 | 10/2006 | Kaplan et al. |
| 7,145,203 B2 | 12/2006 | Wang |
| 7,145,370 B2 | 12/2006 | Bernard et al. |
| 7,149,118 B2 | 12/2006 | Diorio et al. |
| 7,177,182 B2 | 2/2007 | Diorio et al. |
| 7,183,926 B2 | 2/2007 | Diorio et al. |
| 7,187,237 B1 | 3/2007 | Diorio et al. |
| 7,187,290 B2 | 3/2007 | Hyde et al. |
| 7,199,663 B2 | 4/2007 | Diorio et al. |
| 7,212,446 B2 | 5/2007 | Diorio et al. |
| 7,215,251 B2 | 5/2007 | Hyde |
| 7,221,596 B2 | 5/2007 | Pesavento et al. |
| D543,976 S | 6/2007 | Oliver |
| 7,233,274 B1 | 6/2007 | Kuhn |
| D546,819 S | 7/2007 | Oliver |
| D546,820 S | 7/2007 | Oliver |
| D546,821 S | 7/2007 | Oliver |
| D546,822 S | 7/2007 | Oliver |
| D547,306 S | 7/2007 | Oliver |
| D547,754 S | 7/2007 | Oliver |
| 7,242,614 B2 | 7/2007 | Diorio et al. |
| 7,245,213 B1 | 7/2007 | Esterberg et al. |
| 7,246,751 B2 | 7/2007 | Diorio et al. |
| D548,225 S | 8/2007 | Oliver |
| 7,253,719 B2 | 8/2007 | Diorio et al. |
| 7,257,033 B2 | 8/2007 | Wang et al. |
| 7,262,092 B2 | 8/2007 | Diorio et al. |
| 7,263,001 B2 | 8/2007 | Wang et al. |
| 7,283,037 B2 | 10/2007 | Diorio et al. |
| 7,283,390 B2 | 10/2007 | Pesavento |
| 7,289,358 B2 | 10/2007 | Pesavento et al. |
| 7,304,579 B2 | 12/2007 | Diorio et al. |
| 7,307,528 B2 | 12/2007 | Glidden et al. |
| 7,307,534 B2 | 12/2007 | Pesavento |
| 7,312,622 B2 | 12/2007 | Hyde et al. |
| 7,315,067 B2 | 1/2008 | Wang |
| D562,810 S | 2/2008 | Oliver |
| D563,397 S | 3/2008 | Oliver |
| 7,375,398 B2 | 5/2008 | Wang et al. |
| 7,380,190 B2 | 5/2008 | Hara et al. |
| D570,337 S | 6/2008 | Oliver |
| 7,382,257 B2 | 6/2008 | Thomas et al. |
| 7,388,420 B2 | 6/2008 | Diorio et al. |
| 7,388,468 B2 | 6/2008 | Diorio et al. |
| 7,389,101 B2 | 6/2008 | Diorio et al. |
| 7,391,329 B2 | 6/2008 | Humes et al. |
| 7,394,324 B2 | 7/2008 | Diorio et al. |
| 7,400,255 B2 | 7/2008 | Horch |
| 7,403,122 B1 | 7/2008 | Koepp et al. |
| 7,405,659 B1 | 7/2008 | Hyde |
| 7,405,660 B2 | 7/2008 | Diorio et al. |
| D574,369 S | 8/2008 | Oliver |
| D574,370 S | 8/2008 | Oliver |
| 7,408,466 B2 | 8/2008 | Diorio et al. |
| 7,408,809 B2 | 8/2008 | Diorio et al. |
| 7,417,548 B2 | 8/2008 | Kavounas et al. |
| 7,419,096 B2 | 9/2008 | Esterberg et al. |
| 7,420,469 B1 | 9/2008 | Oliver |
| 7,423,539 B2 | 9/2008 | Hyde et al. |
| D578,114 S | 10/2008 | Oliver |
| 7,432,814 B2 | 10/2008 | Dietrich et al. |
| 7,436,308 B2 | 10/2008 | Sundstrom et al. |
| 7,448,547 B2 | 11/2008 | Esterberg |
| 7,472,835 B2 | 1/2009 | Diorio et al. |
| 7,482,251 B1 | 1/2009 | Paulsen et al. |
| D586,336 S | 2/2009 | Oliver |
| D587,691 S | 3/2009 | Oliver |
| 7,525,438 B2 | 4/2009 | Hyde et al. |
| D592,192 S | 5/2009 | Oliver |
| 7,528,724 B2 | 5/2009 | Horch |
| 7,528,728 B2 | 5/2009 | Oliver et al. |
| 7,541,843 B1 | 6/2009 | Hyde et al. |
| 7,561,866 B2 | 7/2009 | Oliver et al. |
| 7,592,897 B2 | 9/2009 | Diorio et al. |
| 7,616,120 B1 | 11/2009 | Humes et al. |
| D605,641 S | 12/2009 | Oliver |
| D606,056 S | 12/2009 | Oliver |
| D606,057 S | 12/2009 | Oliver |
| 7,633,376 B2 | 12/2009 | Diorio et al. |
| 7,633,377 B2 | 12/2009 | Sadr |
| 7,651,882 B1 | 1/2010 | Bockorick et al. |
| D610,576 S | 2/2010 | Oliver |
| 7,667,231 B2 | 2/2010 | Hyde et al. |
| 7,667,589 B2 | 2/2010 | Desmons et al. |
| 7,667,652 B2 | 2/2010 | Gevargiz et al. |
| D611,037 S | 3/2010 | Oliver |
| D613,276 S | 4/2010 | Oliver |
| 7,696,882 B1 | 4/2010 | Rahimi et al. |
| D617,320 S | 6/2010 | Oliver |
| 7,733,227 B1 | 6/2010 | Pesavento et al. |
| D620,484 S | 7/2010 | Oliver |
| D620,928 S | 8/2010 | Oliver |
| 7,768,248 B1 | 8/2010 | Hyde |
| 7,768,406 B1 | 8/2010 | Peach et al. |
| 7,808,387 B1 | 10/2010 | Kuhn |
| 7,830,262 B1 | 11/2010 | Diorio et al. |
| 7,830,322 B1 | 11/2010 | Oliver et al. |
| 7,872,582 B1 | 1/2011 | Diorio |
| 7,873,326 B2 | 1/2011 | Sadr |
| 7,907,899 B1 | 3/2011 | Oliver |
| 7,917,088 B2 | 3/2011 | Hyde et al. |
| 7,920,046 B1 | 4/2011 | Aiouaz et al. |
| 7,969,236 B1 | 6/2011 | Hyde et al. |
| 7,973,643 B2 | 7/2011 | Hyde et al. |
| 7,973,645 B1 | 7/2011 | Moretti et al. |
| 7,978,005 B1 | 7/2011 | Hyde et al. |
| 7,982,611 B1 | 7/2011 | Picasso et al. |
| 7,990,249 B1 | 8/2011 | Hyde et al. |
| 7,999,675 B2 | 8/2011 | Diorio et al. |
| 8,044,774 B1 | 10/2011 | Diorio |
| 8,044,801 B1 | 10/2011 | Hyde et al. |
| 8,063,740 B1 | 11/2011 | Diorio et al. |
| 8,072,311 B2 | 12/2011 | Sadr et al. |
| 8,072,327 B2 | 12/2011 | Enyedy et al. |
| 8,072,329 B1 | 12/2011 | Srinivas et al. |
| 8,077,013 B2 | 12/2011 | Cooper |
| 8,082,556 B1 | 12/2011 | Aiouaz et al. |
| 8,115,590 B1 | 2/2012 | Diorio et al. |
| 8,115,597 B2 | 2/2012 | Oliver et al. |
| 8,115,632 B1 | 2/2012 | Rahimi et al. |
| 8,120,488 B2 | 2/2012 | Bloy |
| 8,120,494 B1 | 2/2012 | Aiouaz et al. |
| 8,134,451 B1 | 3/2012 | Diorio |
| 8,154,385 B2 | 4/2012 | Aiouaz et al. |
| 8,159,367 B2 | 4/2012 | Hofer et al. |
| 8,174,367 B1 | 5/2012 | Diorio |
| 8,174,369 B2 | 5/2012 | Jones et al. |
| 8,188,927 B1 | 5/2012 | Koepp et al. |
| 8,193,912 B1 | 6/2012 | Gutnik et al. |
| 8,201,748 B2 | 6/2012 | Koepp et al. |
| 8,224,610 B2 | 7/2012 | Diorio et al. |
| 8,228,175 B1 | 7/2012 | Diorio et al. |
| 8,237,562 B1 | 8/2012 | Picasso et al. |
| 8,244,201 B2 | 8/2012 | Oliver et al. |
| 8,258,918 B1 | 9/2012 | Diorio et al. |
| 8,258,955 B1 | 9/2012 | Hyde et al. |

(56) References Cited

U.S. PATENT DOCUMENTS

| | | |
|---|---|---|
| 8,260,241 B1 | 9/2012 | Hyde |
| 8,279,045 B2 | 10/2012 | Diorio et al. |
| 8,294,582 B1 | 10/2012 | Humes et al. |
| 8,325,014 B1 | 12/2012 | Sundstrom et al. |
| 8,325,042 B1 | 12/2012 | Hyde et al. |
| 8,326,256 B1 | 12/2012 | Kuhn |
| 8,332,656 B2 | 12/2012 | Jones et al. |
| 8,344,823 B2 | 1/2013 | Bloy et al. |
| 8,344,857 B1 | 1/2013 | Oliver et al. |
| 8,344,858 B2 | 1/2013 | Bloy |
| 8,350,665 B1 | 1/2013 | Sundstrom et al. |
| 8,354,917 B2 | 1/2013 | Diorio et al. |
| 8,390,425 B1 | 3/2013 | Cooper et al. |
| 8,390,430 B1 | 3/2013 | Sundstrom et al. |
| 8,390,431 B1 | 3/2013 | Diorio |
| 8,391,785 B2 | 3/2013 | Hyde et al. |
| 8,395,482 B2 | 3/2013 | Sadr et al. |
| 8,400,271 B2 | 3/2013 | Sadr |
| 8,421,631 B2 | 4/2013 | Bloy et al. |
| 8,427,315 B2 | 4/2013 | Aiouaz et al. |
| 8,428,515 B1 | 4/2013 | Oliver |
| 2007/0046439 A1* | 3/2007 | Takaku et al. ............ 340/10.41 |
| 2007/0106574 A1* | 5/2007 | Kappel et al. .................. 705/28 |
| 2008/0042838 A1 | 2/2008 | Levin et al. |
| 2010/0207738 A1 | 8/2010 | Bloy |
| 2010/0219953 A1 | 9/2010 | Bloy |
| 2010/0225480 A1 | 9/2010 | Bloy et al. |
| 2010/0310019 A1 | 12/2010 | Sadr |
| 2011/0032079 A1 | 2/2011 | Bloy et al. |
| 2011/0063113 A1 | 3/2011 | Hook et al. |
| 2011/0090059 A1 | 4/2011 | Sadr |
| 2011/0090061 A1 | 4/2011 | Hofer et al. |
| 2011/0090062 A1 | 4/2011 | Hofer et al. |
| 2011/0254664 A1 | 10/2011 | Sadr et al. |
| 2011/0279261 A1 | 11/2011 | Gauger et al. |
| 2012/0112913 A1 | 5/2012 | Bloy |
| 2012/0139704 A1 | 6/2012 | Sadr et al. |
| 2012/0188058 A1 | 7/2012 | Lee et al. |
| 2012/0212331 A1 | 8/2012 | Jones et al. |
| 2012/0257733 A1* | 10/2012 | Kosseifi et al. ............ 379/93.17 |
| 2012/0275546 A1 | 11/2012 | Divsalar |
| 2013/0049925 A1* | 2/2013 | Subramanian ................ 340/3.1 |
| 2013/0093572 A1 | 4/2013 | Bloy et al. |
| 2013/0099898 A1 | 4/2013 | Bloy |
| 2013/0099901 A1 | 4/2013 | Jones et al. |

* cited by examiner

RADIO FREQUENCY IDENTIFICATION SYSTEM FOR TRACKING AND MANAGING MATERIALS IN A MANUFACTURING PROCESS

RELATED APPLICATIONS

This application is a continuation of PCT/US13/29408, entitled "A Radio Frequency Identification System for Tracking and Managing Materials in a Manufacturing Process," filed Mar. 6, 2013 which claims the benefit under 35 U.S.C. §119(e) of U.S. Provisional Patent Application Ser. No. 61/607,406, entitled "Automation Project," filed Mar. 6, 2012 and U.S. Provisional Patent Application Ser. No. 61/708,518, entitled "A Radio Frequency Identification System for Tracking and Managing Material Flow in a Manufacturing Process," filed Oct. 1, 2012, the entire disclosures of which are hereby expressly incorporated by reference herein.

TECHNICAL FIELD

The present disclosure generally relates to using radio frequency identification (RFID) technology to advantageously track, manage and control the flow and or positions of material, such as inventory items, within a manufacturing process or an inventory storage facility, to make the tracking and retrieval of inventory items more automatic and efficient.

BACKGROUND

Many manufacturing processes today are highly automated. However, in some industries, manufacturing processes still require manual operation and/or human intervention. An example industry with manually intensive manufacturing processes is the corrugated packaging industry, which typically produces corrugated boxes, point-of-purchase displays, and other kinds of paper based protective and distribution packaging.

In a typical corrugated plant, the manufacturing process can be generally divided into four stages. In the first stage, rolls of paper material, called rollstock, are received and stored in a rollstock inventory area. In the second stage, the paper rolls are transferred to a wet end area of a corrugator or corrugation machine where the rolls are converted into a continuous corrugated board by gluing multiple layers of paper together in some manner, such as gluing a layer of corrugated paper with one or two layers of smooth paper. At the end of the corrugator machine, the corrugated board or paper is cut into sheets which are stacked before being placed in a work in process (WIP) area to wait for further processing. In the third stage, the stacks of corrugated sheets are delivered from the WIP area to a finishing area where machines typically called folders and gluers convert the sheets into boxes and other packaging or display products through operations such as die-cutting, printing, stapling, folding and gluing. During this stage, the boxes or other packaging and display products may be printed using, for example, printing plates or may be painted to provide graphics on the products. In the fourth stage, finished goods coming off the finishing area are banded and are palletized to get these finished goods ready for either storage in a warehouse or dispatch and delivery to customers.

In each stage of the manufacturing process, various manual operations are typically performed. These manual operations are labor intensive and are generally prone to human errors, thereby creating many problems and inefficiencies in the corrugated plant. Such problems occur in inventory management where each received roll must be manually labeled to be registered in the rollstock inventory. The location of a roll in the rollstock area needs to be recorded so that the whereabouts of the roll can be tracked. However, if a worker forgets to record the location of a roll or makes an error in the recording of the location of a roll, then the roll may become lost in the inventory. Poor inventory management may also cause a worker to transfer a wrong roll from the rollstock area to the wet end area of the corrugator machine. If the error is not recognized, then the wrong roll will be used in the manufacturing process resulting in the production of the wrong type of corrugated material or paper, increased cost and poor quality. If the error is recognized, then the worker must go back and spend additional effort to manually search for the correct roll. Moreover, if the correct roll cannot be found, then the worker may be forced to make a management decision by choosing a different roll. As a result, costly unauthorized upgrades may occur in which a more expensive roll is used to make a final product than is needed or called for by a particular manufacturing job.

Moreover, in many cases, it is difficult to track and manage partial rolls, which are rolls that have been used for one or more jobs, but which still contain paper material thereon. In particular, operators typically know the approximate amount of paper on a particular roll within the rollstock area when the roll has never been used or when the roll is first added to the inventory. However, after use, in which some of the paper from a particular roll is removed, the roll is removed from the corrugator machine and is returned to inventory. In these cases, it is necessary to record the amount of paper used from the roll during a particular manufacturing job, which is typically a manual process. If this record keeping is not performed or is performed inaccurately or inconsistently, operators generally do not know how much paper is on a roll or do not trust the records of how much paper is on a roll. In these cases, operators typically opt to use a new (previously unused roll) for a job instead of a partial roll which may or may not have sufficient paper thereon for the job, to assure that the job can be completed without running out of paper on the roll. This procedure leads to the existence of many partial rolls in inventory, which take up space and increase manufacturing costs of the plant because these rolls never get used, or are not matched correctly to the size of the job, thereby creating wasted material.

Other problems can be found in process flow management of processes where procedures require workers to manually track or label intermediate products and finished goods so that the products can be located and delivered to the next processing stage. For example, intermediate products such as stacks of corrugated sheets must be manually labeled with proper job order numbers in the WIP area to ensure proper delivery to proper work stations in the finishing area. Likewise, finished goods coming off the finishing area must be manually labeled with proper banding sequence numbers so that workers can employ proper banding sequences in the banding machines. However, mislabeling or failure to label the intermediate products may cause considerable downtime or delays in the manufacturing process. Furthermore, errors in manual labeling, may result in costly consequences if the products go missing or the wrong products get made, for example, by having the wrong intermediate products delivered to the work stations in the finishing area or by having the intermediate or finished products get banded using an incorrect banding procedure because a wrong product number or banding sequence number was used to activate the banding sequence.

Further problems exist in shipping management where the banded finished goods must be manually documented in a loading bay so that a driver can find and ship the correct products to customers. Due to time constraints, this type of manual documentation is rarely performed. As a result, many times, the needed product is not at the correct location so the driver or loader has to spend a great deal of effort to look for the product in the loading bay. Once the driver finds the correct product and finishes loading the truck, the driver must account for any under/over amount against a customer shipping order. Errors and omissions in the manual documentation process can lead to a myriad of shipping-related problems such as loading the wrong products on a truck, recording the wrong products as being shipped, not recording the products that are shipped, having under/over shipment of products, etc. These problems affect the overall business by making customers feel dissatisfied and distrustful, as well as increasing costs.

Many corrugated plants have adopted the use of barcode technology to address some of the abovementioned problems. A barcode is an optical machine-readable representation of data relating to an object that is attached to the barcode. While the use of barcodes offers an improvement in accuracy over manual labeling, manual operations are still needed because human operators must place barcode readers in a direct line-of-sight to the printed barcode in order to register a read. Thus, many problems still exist in corrugated plants that use barcodes. For example, problems exist in inventory management where each received roll is registered in the rollstock inventory by manually or automatically placing and scanning a barcode on the roll, and a barcode on the side, or the ceiling, of an inventory aisle where the roll is placed. However, if workers forget to scan both barcodes when storing a roll, or when barcode readers fail, then the roll becomes lost in the inventory. Thus, despite the use of a barcode system, the location of a roll in the rollstock still typically needs to be manually recorded. Moreover, if a needed roll cannot be located in the rollstock, then manual searching and scanning must be conducted in order to determine the whereabouts of the roll. Problems also exist in process flow management procedures that use barcodes. In particular, currently, workers must manually scan the barcode on the products or rolls before moving the rolls or finished product to the next processing or delivery stage where another manual scan takes place to validate the movement. Time constraints and barcode reader failures often compel workers to forgo such scans, which may result in costly errors in the manufacturing process. Furthermore, in locations where outdoor storage is an option, barcode readers often fail because the readers cannot read in sunlight or bright areas. When scanning equipment fails, workers must enter information and data manually, which prompts the same type of human errors that can occur with manual labeling. Still other problems exist in shipping management where drivers must perform multiple scans to ensure that the correct product is going to the correct vehicle for shipping. However, due to time constraints and other factors, drivers rarely perform all the necessary scans, which result in the wrong products being shipped and thus leads to dissatisfied customers and waste.

Printed barcodes have other shortcomings as well. A barcode can be easily damaged (e.g., outdoor storage areas), and if the barcode gets ripped, soiled or torn off, there is no way to make a proper scan. Also, reading a barcode may be time-consuming if the barcode is not properly oriented to the reader. Thus, with a barcode system, a large amount of manual data collection activity is still needed, which leaves the manufacturing process manually intensive and dependent on human intervention.

To provide improvement over barcodes, the use of radio frequency identification (RFID) technology has been introduced in some portions of some manufacturing plants. A conventional RFID system uses stationary or hand-held RFID readers to identify RFID tags attached to objects. Unlike barcodes which must be physically located next to and be in close or direct proximity to the barcode reader in order to read, RFID technology does not typically require a tag to be in direct proximity to the reader. However, RFID technology still requires some line-of-sight communication between the reader and tag in order to register a read. Also, unlike barcodes, which offer read-only capability, each RFID tag may be read and write capable, meaning that information can be altered in the tag. Currently, the use of RFID tags in corrugated plants is limited to inventory management, in which each paper roll, for example, may have an associated RFID tag inserted manually into the core of the roll that allows the roll to be registered in the rollstock inventory when the roll passes near a stationary reader. This remote reading of the RFID tag eliminates manual operations such as manually labeling or scanning the roll, but manual operations such as removing the core plug to manually insert the RFID tag still remain.

While the problems associated with not registering or improperly registering the roll in the inventory may be mitigated with RFID tags, the roll may still become lost in the inventory because the location of the roll in the rollstock still needs to be manually recorded. Moreover, misplaced rolls can result in tedious manual searches because stationary RFID readers cannot be used to locate arbitrarily placed rolls.

More particularly, one of the main problems with the current use of RFID in corrugated plants is that the stationary RFID readers must be placed at specific spots or locations within the plant and thus only provide nodal reading of tags. For example, RFID readers are typically placed at doorways to define a portal or are placed at or near a manufacturing area to define a read node. The tagged product can only be read at these nodes within the plant, which leads to a lot of problems. If a tagged product is picked up from one manufacturing area and is transferred to a second manufacturing area without going through a read node, then the location of the tagged product is still lost or not accurately tracked. Moreover even when a transfer is completed properly, the transfer is not recognized until the tagged product reaches the RFID reader defining the portal or read node near the second manufacturing area. Moreover, the product is only known to be at or near the read node. As a result, movement of a tagged product within a plant is tracked inconsistently and very inaccurately using typical RFID technology. Stationary readers also have a problem in that the signals sent out by the readers tend to "reflect" off objects such as forklift or other objects, and create spurious reads.

Because RFID technology, as currently used in corrugated plants, requires the use of a number of fixed or stationary RFID readers that can only detect the passage of a tag past a particular point, plants have used hand-held RFID readers to assist in tracking the whereabouts of products or raw materials, such as rollstock. However, the use of handheld readers still requires human operators to carry the readers to a point where tagged objects are located in order to read the tags on the products, in which case the amount of manual operations is similar to that of the barcode system.

Some efforts have been made in the pulp and paper industry to resolve the problem of tracking the location of rolls of material in inventory without the use of handheld readers. As disclosed in U.S. Pub. No. 2004/0102870, an RFID reader is placed on a forklift which moves the reader around a warehouse to assist in locating particular tagged rolls of paper. However, this approach only works when the forklift is in close proximity to the rolls to which the tags are attached and so the forklift driver still has to know the approximate location of the roll in the warehouse to begin a search for a particular roll. Moreover, the tags are directional and the RFID reader requires some line-of-sight to the tags. Thus, if a tag is on one side of the roll and the forklift is on the other side, then the tag cannot be read by the reader.

Moreover, aside from inventory management, RFID usage has not been incorporated into other processing functions such as process flow management or shipping management, in corrugated plants. Some efforts have been made in to use RFID to manage flow through a process, but these efforts are for throughput management only and do not increase product quality or manufacturing efficiencies within a plant. For example, U.S. Pat. No. 7,970,484 discloses a method that uses RFID tags on boxes containing products flowing through a manufacturing line to generate stop and go signals to control the throughput of the production process. However, the method only functions to control the throughput of the process, and does not actually control the flow of the process materials, for example, by determining what materials are needed at what locations in the process or where materials should be sent in order to assure that the proper or desired final product is being made.

SUMMARY

A manufacturing process and inventory management or tracking system uses a radio frequency identification (RFID) detection system which may be, for example, a phased array antenna based RFID detection system, to track and manage material storage and flow of material in a manufacturing process or plant. The management or tracking system operates to track and to provide the location of various inventory within an inventory region of the plant and may operate in conjunction with the various machines that implement manufacturing stages or steps of the manufacturing process to assure that the correct materials (e.g., inventory, machine parts, etc.) and processing procedures are used at or on the various production machines of the process to produce a particular product as defined by a job number or job order. The process management system is thereby able to increase the efficiencies of the plant and to increase the quality of the plant production by reducing or eliminating waste, manufacturing errors and shipping errors in the production facility.

Generally speaking, the management system employs a detection and tracking system that uses RFID tags attached to various different materials in the plant, such as raw materials, intermediate products or finished goods, to detect and track the location of these materials at any time and or at any location in the plant including in an inventory region of the plant (including a spare parts inventory) and a manufacturing region of the plant. In one case, the RFID detection and tracking system uses phased array antennas disposed within the plant to scan one or more areas in the plant periodically, so as to detect the location or position of all of the RFID tags in that area in a three dimensional (3D) view. In another case, the RFID detection and tracking system may use multiple spaced apart antennas to scan a region using a triangulation technique to detect the location of RFID tags within the region. The process management system may use the current location of the RFID tags to determine where the materials needed for a production run are located in the plant by associating the RFID tags on various plant materials with job numbers defining products to be produced. The job numbers may also be associated with or define manufacturing steps that need to be taken in the plant to produce the product associated with the job number. The process management system may then implement or manage a particular production run used for a job number by tracking the RFID tags for the various materials to be used in the production run for the job number during the production run to assure that the correct materials are used in the production run and to assure that the correct processing steps or procedures are used at each of the various stages of the production run. If desired, the process management system may interface with one or more controllers within the plant or the manufacturing process to prevent or halt operation of the production machines unless the correct materials are at the correct inputs of the production machines. Alternatively or additionally, the process management system may assure that the correct production programming or procedures are used at each stage of the production run by, for example, loading the correct production programming into the machines based on the RFID tags associated with the product or material being provided to the machine. As part of this process, RFID tags may be applied to intermediate products created during the manufacturing run to enable the process management system to track these intermediate products, so as to assure that the correct intermediate products are provided to the correct processing machines at the correct time when implementing a multi-stage production run for a job number. Still further, in some scenarios, records stored for RFID tags identifying a certain type of intermediate product may be changed or altered to reflect changes in the intermediate product as the product being created flows through the production facility from one stage or step of manufacturing to another stage or step of manufacturing. In this manner, the process management system may assure that the production run for a particular job uses the correct raw materials and that the production equipment is configured or set up to implement the correct manufacturing and packaging steps for a job number which, in turn, helps to assure that the correct product is made for a job number.

Still further, the management system may use the RFID tracking system to perform inventory management and control as well as to perform shipping management and control. In particular, the process management system may detect, track or scan all of the inventory in an inventory area to determine what inventory is present (based on the RFID tags detected during the scan), and provide a 3D view of the location of each piece of inventory. This feature enables the process management system to direct plant personnel to the correct location in the inventory area to get or obtain the correct materials to be used in a production run. Still further, the process management system may update records associated with RFID tags of material, such as rolls of paper, to indicate or track the amount of material left on the roll, for example, or other changes in the material. In a similar manner, the process management system may use the RFID tracking system to detect and track finished goods in a loading bay and may use this information to assure that the correct finished goods are loaded onto the correct truck for shipping to a customer. This feature reduces shipping errors and can further be used to automatically create bills of landing defining exactly what finished goods are being shipped to the customer.

In one embodiment, an inventory tracking system for use in tracking placement of physical items within an inventory tracking region of, for example, a manufacturing plant, includes a radio frequency tag detection system that includes a plurality of radio frequency antennas disposed in a spaced apart manner within the inventory tracking region and a detection controller coupled to the plurality of radio frequency antennas that controls the operation of each of the radio frequency antennas to scan a portion of the inventory tracking region and to detect each of a number of radio frequency tags disposed in the inventory tracking region. Here, the detection controller generates indications of the detected radio frequency tags and the physical locations of the detected radio frequency tags within the inventory tracking region. Moreover, the inventory tracking system includes a tracking system coupled to the radio frequency tag detection system to receive the indications of the detected radio frequency tags and the detected physical locations for the detected radio frequency tags within the inventory tracking region. The tracking system includes a memory for storing inventory item information for each of a plurality of inventory items, the inventory item information for each of the plurality of inventory items including an inventory item radio frequency tag identifier, inventory item identification information defining the identity of the inventory item, and an indication of the current physical location of the inventory item within the inventory tracking region. The inventory tracking system also includes an access system that accesses the memory and provides at least a subset of the inventory item information for one or more of the inventory items to a user for determining the current physical location of the one or more of the inventory items within the inventory tracking region. The tracking system updates the indication of the current physical location of at least one particular inventory item within the inventory tracking region as stored in the memory for the at least one particular inventory item based on the indication of the physical location of the detected radio frequency tag for the at least one particular inventory item as produced by the detection controller.

If desired, the subset of inventory item information may include an indication of the current physical location of the one or more of the inventory items within the inventory tracking region and/or may include the inventory item identification information for the one or more of the inventory items. The tracking system may store, for each of the plurality of inventory items, inventory item identification information including two or more defining characteristics of the inventory item and the inventory item identification information for at least one of the inventory items may include a type of material associated with the inventory item, a source of the inventory item, or an amount of material associated with the inventory item.

If desired, the access system may include a user display system that graphically displays the current physical location of the one or more of the inventory items based on the indication of the current physical location of the one or more of inventory items and the user display system may display the current physical location of the one or more of the inventory items in a graphical manner juxtaposed with or on an indication of at least a portion of the inventory region. The user display system may display the current physical location of one of the inventory items by displaying an indication of a geographical coordinate at which the one of the inventory items is located, or an indication of a two dimensional geographical location of the inventory item within the inventory tracking region. Also, the user display system may graphically display the current physical location of inventory items by displaying an indication of a three dimensional geographical location of one or more of the items within the inventory tracking region.

Still further, the access system may includes an auditory system that generates auditory signals based on the current physical location of one or more of the inventory items, may include a visual system that generates lighted signals based on the current physical location of one or more of the inventory items, and/or may include a tactile system that generates tactile (e.g., vibration) signals based on the current physical location of one or more of the inventory items.

The detection controller may include a beam-steering control system, such as an electronic beam steering or a mechanical beam steering control system that controls the operation of each of the radio frequency antennas using a beam to scan a portion of the inventory tracking region to detect each of a number of radio frequency tags disposed in the scanned portion of the inventory tracking region.

The inventory tracking system may further include an inventory control system that receives the current physical location of at least one of the inventory items from the access system and determines if the one of the plurality of inventory items is in a desired location. Here, the inventory control system may compare the current physical location of the at least one of the inventory items to a desired location of the at least one of the inventory items as defined by a job identifier or a job number associated with a, for example, manufacturing job that uses the at least one of the inventory items. The inventory control system may produce a warning or alert signal when the location of the at least one of the inventory items associated with the job identifier is not at the desired location for the inventory item for the job defined by the job identifier when running the job. In some situations, the desired location may be associated with a location of one of the inventory items within a manufacturing process during execution of the manufacturing process during the job. The inventory control system may further detect movement of the at least one of the inventory items based on the job identifier and may compare the movement of the inventory item with a desired movement of the inventory item as specified by the job identifier. If desired, the inventory control system may enable a portion of a manufacturing process to occur based on the detected current physical location of the at least one of the inventory items.

In another embodiment, a method of tracking inventory within an inventory region includes periodically scanning the inventory region with one or more radio frequency antennas to detect one or more radio frequency tags in the inventory region, each of the radio frequency tags being associated with an inventory item (or in some cases an employee handling the inventory item), and determining a location for each of the one or more detected radio frequency tags within the inventory region based on the detection of the one or more radio frequency tags within a scan, wherein the location for each of the one or more detected radio frequency tags is resolved to a region less than the coverage area of the steerable antennas. The tracking method also includes storing, in a computer readable memory, for each of the detected radio frequency tags, inventory item information, wherein the inventory item information for a radio frequency tag includes an inventory item radio frequency tag identifier, inventory item identification information defining the identity of the inventory item, and current physical location information for the inventory item. The tracking method updates the current physical location information of at least one inventory item within the inventory tracking region as stored in the computer readable memory based on the determined location of the detected radio frequency tag for the at least one inventory item as determined during one or more scans. Moreover, the tracking method includes accessing the stored inventory item information to determine the physical location of the one or more of the set of inventory items within the inventory region.

The tracking method may further include storing, as part of the inventory item identification information, two or more characteristics of the inventory item, such as an amount of material associated with the inventory item and a type of material or inventory item. The tracking method may also include displaying the physical location of the one or more of the inventory items within the inventory region on a display device such as by graphically displaying an indication of the current physical location of one or more of the inventory items on a user display device juxtaposed with or on an indication of at least a portion of the inventory region or by displaying the physical location of the one or more of the inventory items by displaying at least a portion of the inventory item identification information along with an indication of the current physical location of one or more of the inventory items on a user display device.

The tracking method may further include generating an auditory signal based on the current physical location of one or more of the inventory items, generating a visual alarm signal based on current physical location of one or more of the inventory items, and/or generating other types of user interface signals. The tracking method may include periodically scanning the inventory region with one or more steerable radio frequency antennas by periodically scanning the inventory region using a beam steering scanning technique for each of the one or more steerable radio frequency antennas.

The tracking method may further include using the physical location of one of the inventory items as stored in the memory to determine if the one of the inventory items is in a desired location as defined by a job identifier, and may include producing a warning signal when the current physical location of the one of the inventory items associated with the job identifier is not at the desired location for the inventory item for the job identifier. The tracking method may include using the physical location of one of the inventory items as stored in the memory to detect movement of the one of the inventory items within the inventory region and determining if the detected movement of the one of the inventory items is a desired movement based on a job identifier. The tracking method may also include enabling or disabling the operation of a portion of a manufacturing process based on the physical location of one of the inventory items.

In another embodiment, a method of tracking inventory within an inventory region includes periodically scanning the inventory region with one or more radio frequency antennas to detect each of a plurality of radio frequency tags in the inventory region, each of the radio frequency tags being associated with a different inventory item, and determining a location for each of the one or more detected radio frequency tags within the inventory region based on the detection of the one or more radio frequency tags within a scan. The region may be scanned with the radio frequency antennas using a steerable antenna, such as an electronically steerable antenna, or may be scanned with multiple antennas using a triangulation technique, for example. Here, the location for each of the one or more detected radio frequency tags is resolved to a region less than the coverage area of the antennas. The tracking method also includes storing inventory item information in a computer readable memory for each the different inventory items, the inventory item information for a particular inventory item including a radio frequency tag identifier, inventory item identification information defining the identity of the inventory item, and current physical location information for the inventory item, and updating the current physical location information of each of the inventory items within the inventory tracking region as stored in the computer readable memory based on the determined location of the detected radio frequency tag for the inventory items as determined during one or more scans. The tracking method also includes enabling access to the stored inventory item information for each of the inventory items to determine the physical location of the inventory items within the inventory region. The tracking method may include displaying the physical location of a multiplicity of the inventory items within the inventory region on a display device by graphically displaying an indication of the current physical location of the multiplicity of inventory items on a user display device juxtaposed on an indication of at least a portion of the inventory region and/or by displaying at least a portion of the inventory item identification information for one of the multiplicity of inventory items along with the indication of the current physical location of the one of the multiplicity of inventory items on a user display device.

In still another embodiment, a method of controlling a manufacturing process includes storing manufacturing item information in a computer readable memory for each of a set of manufacturing items, the manufacturing item information for a particular manufacturing item including a radio frequency tag identifier and manufacturing item identification information defining the identity of the manufacturing item and storing manufacturing process information defining manufacturing information associated with a manufacturing job. The manufacturing control method also includes scanning a manufacturing region in which a manufacturing process occurs with one or more radio frequency antennas to detect one or more radio frequency tags in the manufacturing region, each of the radio frequency tags being associated with a different manufacturing item, and determining if one of the manufacturing items is at a location in the manufacturing process called for by the manufacturing process information for the manufacturing job based on the identity of the radio frequency tags detected during the scan of the manufacturing process. The manufacturing control method also affects the operation of the manufacturing process if one of the manufacturing items is not at a location in the manufacturing process called for by the manufacturing process information for the manufacturing job when the manufacturing process is to be run for the manufacturing job.

The manufacturing control method may affect the operation of the manufacturing process by disabling the operation of the manufacturing process when the one of the manufacturing items is not at a location in the manufacturing process called for by the manufacturing process information for the manufacturing job and may disable the operation of the manufacturing process by sending an interrupt signal to a controller that controls the operation of equipment within the manufacturing process to prevent the controller from implementing the operation of equipment within the manufacturing process. Disabling the operation of the manufacturing process may also or instead include sending an enable signal to a controller that controls the operation of equipment within the manufacturing process to enable the controller to implement the operation of equipment within the manufacturing process only when the one of the manufacturing items is at a location in the manufacturing process called for by the manufacturing process information for the manufacturing job. Affecting the operation of the manufacturing process may in addition or instead include notifying a user if one of the manufacturing items is not at a location in the manufacturing process called for by the manufacturing process information for the manufacturing job when the manufacturing process is to be run for the manufacturing job. Notifying a user may include initiating a visual warning on a user display device associated with monitoring or control of the manufacturing process, may include providing an audible signal to a user or may include providing a tactile signal to the user.

The manufacturing control method may scan the manufacturing region in which a manufacturing process occurs with one or more radio frequency antennas using one or more for example, steerable, such as electronically steerable, radio frequency antennas to scan the manufacturing region or may scan the manufacturing region with multiple antennas using a triangulation technique, and may store the detected physical location information of each of the manufacturing items within the computer readable memory based the location of the detected radio frequency tag for the manufacturing items as determined during one or more scans. The manufacturing items may be inventory items of raw material used in the manufacturing process such as paper rolls, glues, or inks used in a packaging manufacturing process and/or may be components of a manufacturing machine, such as a dye, a press, or a machine tool. Scanning the manufacturing region in which a manufacturing process occurs with one or more radio frequency antennas may include resolving the location for each of the one or more detected radio frequency tags to a region (e.g., area or volume) that is less than the coverage area of each of the one or more radio frequency antennas, such as to a region or location equal to or less than one square or cubic meter, one square or cubic foot, one square or cubic inch, as examples.

The manufacturing control method may further include applying a radio frequency tag to one or more intermediate manufacturing items created during a first portion of the manufacturing process (or alternatively created by an outside source but to be used in the manufacturing process), and the process of scanning the manufacturing region in which a manufacturing process occurs with one or more radio frequency antennas to detect one or more radio frequency tags in the manufacturing region may include scanning a manufacturing region associated with a second portion of the manufacturing process to detect the radio frequency tag on the one or more intermediate manufacturing process items. Here, determining if one of the manufacturing items is at a location in the manufacturing process called for by the manufacturing process information for the manufacturing job may include determining if the one or more intermediate manufacturing items are in a location called for by a job identifier associated with operation of the second portion of the manufacturing process.

In yet another embodiment, a manufacturing process tracking system for assisting in the operation of a manufacturing process that uses manufacturing equipment to produce a product, includes a radio frequency tag detection system including one or more radio frequency antennas disposed within a manufacturing region in which the manufacturing equipment is located and a detection controller coupled to the one or more radio frequency antennas that controls the operation of the radio frequency antennas to electronically scan a portion of the manufacturing region and to detect each of a number of radio frequency tags disposed in the manufacturing region, wherein the detection controller generates indications of the detected radio frequency tags and the physical locations of the detected radio frequency tags within the manufacturing region. The manufacturing process tracking system also includes a radio frequency tag tracking system coupled to the radio frequency tag detection system to receive the indications of the detected radio frequency tags and the detected physical locations for the detected radio frequency tags within the manufacturing region, the radio frequency tag tracking system including a tracking memory for storing the detected physical location for each of the detected radio frequency tags as detected by the radio frequency tag detection system. Likewise, the manufacturing process tracking system includes a manufacturing tracking controller coupled to the radio frequency tag tracking system that includes a manufacturing item memory storing manufacturing item information for each of a plurality of manufacturing items, the manufacturing item information for each of the plurality of manufacturing items including a manufacturing item radio frequency tag identifier and manufacturing item identification information defining the identity of the manufacturing item and a manufacturing process memory storing manufacturing process information for a manufacturing job, the manufacturing process information defining manufacturing items to be used in or on the manufacturing equipment of the manufacturing process when implementing the manufacturing job. The manufacturing process tracking system also includes a manufacturing system processor that determines, based on the manufacturing process information and the manufacturing item information, if a manufacturing item to be used in a manufacturing job is currently located in a location within the manufacturing region called for by the manufacturing job and to produce a signal indicative of the determination, the signal adapted to affect the operation of the manufacturing job on the manufacturing equipment.

The manufacturing process tracking system may operate with manufacturing items to be used in a manufacturing job that are removable pieces of equipment used on the manufacturing equipment when implementing the manufacturing job, such as a dye, a press, or a machine tool. The manufacturing items may also or instead be raw materials or intermediate materials used in the manufacturing job to produce the product.

The manufacturing system processor may use the signal indicative of the determination to produce a control signal that controls the manufacturing equipment to implement the manufacturing job. For example, the control signal may enable the manufacturing equipment to operate. Additionally or instead, the manufacturing process tracking system processor may send operational information to the manufacturing equipment to operate in a particular manner for the manufacturing job. The manufacturing processor may send an error signal, such as an audio, visual or tactile signal, to a user indicating the existence of an incorrect manufacturing item in the manufacturing region for the manufacturing job or a missing manufacturing item in the manufacturing region for the manufacturing job. The manufacturing processor may send the signal to a user interface to indicate whether a manufacturing item in the manufacturing region is the correct manufacturing item for the manufacturing job, or may produce an audio indication indicating whether a manufacturing item in the manufacturing region is the correct manufacturing item for the manufacturing job.

DETAILED DESCRIPTION

An inventory and process management or tracking system uses RFID technology to track and control the flow of inputs and outputs in a manufacturing process by using a single or a network of steerable antennas, such as beam steerable phased array antennas or other beam steerable antennas, to provide real-time, three dimensional location detection and tracking of RFID tagged materials and goods being used in an inventory or in a manufacturing process. The system uses the detected location and movement of the RFID tagged materials and goods to perform various steps in managing the flow or use of materials within a process to increase the productivity of the process including inventory management, to increase the production accuracy or quality of production of the process and to minimize labor costs and other costs associated with manual operational errors within the plant or process.

More particularly, the process management system performs inventory management by documenting, tracking and recording the location of received raw materials in an inventory area or region of a plant using the 3D RFID detection and tracking system. The system updates the inventory by tracking the movement of the raw materials from place to place within the inventory area or region to other areas or regions of the plant where the raw materials are converted into intermediate products and/or finished goods. The system also directs process or production activities by first determining the required inputs (e.g., the raw materials), the required process activities (e.g., the process steps), and the generated outputs (e.g., the finished goods) in each stage of a manufacturing process. The system then regulates or manages the overall process or production flow by tracking and directing the movement of material inputs to and material outputs from each manufacturing stage using RFID tags, thereby improving efficiency, reducing downtime and cutting overall costs in the plant. Still further, the system manages the delivery, loading and shipping of finished goods by tracking the movement of finished goods within a loading bay of the plant to assure that the correct goods (for a particular job order or job number) are placed onto the correct truck for shipping or delivery to the customer. The system may also assure that the right number of goods are loaded, and may automatically generate, for example in real-time, a bill of landing including the exact goods loaded onto the truck. Moreover, if desired, the system may assure that finished goods are loaded onto a truck in the proper order to assure that unloading the truck is easier or more efficient when, for example, the truck must make multiple deliveries to different locations.

Figure 1:
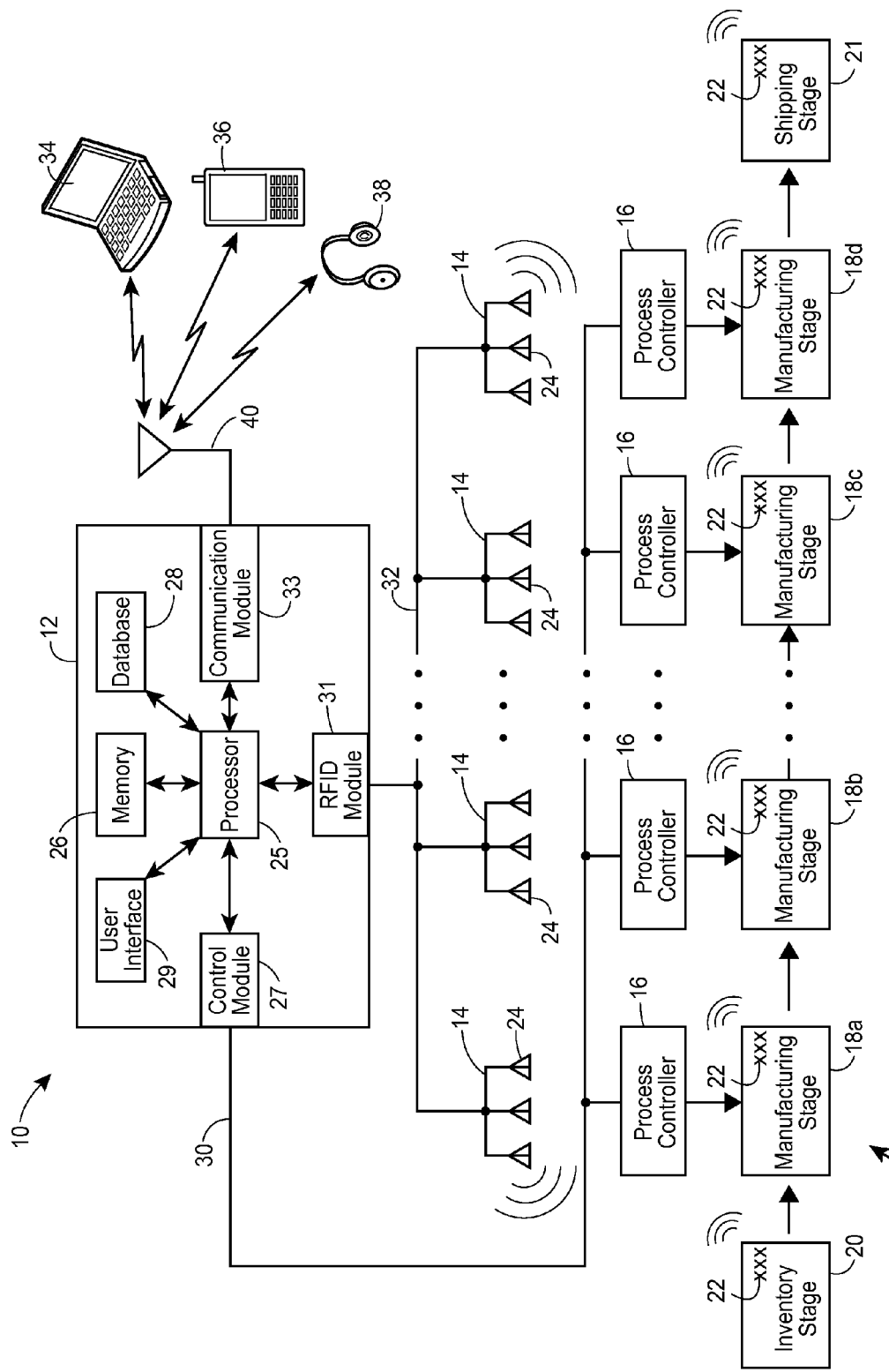
FIG. 1 is a diagram illustrating an example inventory and process management system that uses RFID technology to track inputs and outputs to manage or control the process flow in a manufacturing process.

FIG. 1 illustrates an example inventory and process management or tracking system 10 including a command system 12 connected to an RFID detection and tracking system that includes a network of antenna systems 14 (which may be for example, one or more electronically steerable phased array antenna systems each having multiple antenna elements 24) connected to a processor (not shown) that directs or operates the antennas or elements 24 in a manner described in more detail herein and performs RFID detection and tracking. While the antenna systems 14 may use an electronically steerable beam for RFID detection and tracking, other forms of antenna systems including directional antenna systems, for example, mechanically steerable beam antennas such as rotatable or movable parabolic antennas, Yagi antennas, log periodic antennas, corner antennas, etc. may be implemented to perform RFID detection and tracking. The command system 12 is also connected to one or more process or manufacturing controllers 16, each controlling process activities in one of a set of manufacturing stages 18a to 18d associated with a manufacturing process 19. The manufacturing process 19 may, in this example, include an inventory stage 20 and a shipping stage 21, which are not controlled by the process or manufacturing controllers 16. With reference to FIG. 1, the manufacturing process 19 includes four manufacturing stages or regions, but generally speaking, the manufacturing process 19 could include any other number of manufacturing stages or regions. During operation, material inputs and material outputs at each stage or region of the manufacturing process 19 are tagged with RFID tags 22 for identification and tracking. The antenna systems 14, which may be, by way of example, any of the phased array systems sold by RF Controls LLC and/or disclosed in U.S. Pub. No. 2010/0207738 (the entire disclosure of which is hereby expressly incorporated by reference herein), are used to detect and track the location and movement of the RFID tagged material inputs and material outputs and use this tracking information to manage the manufacturing process 19 using, for example, the controllers 16. Although FIG. 1 illustrates the phased array antenna systems 14 as having three antenna elements 24, the phased array antenna systems 14 in general may include any number of antenna elements disposed in a one-dimensional pattern (e.g., a line), a two dimension pattern (e.g., a grid) or even a three dimensional pattern.

Generally speaking, the command system 12 includes a processor 25 for implementing functions, routines and instructions stored in a memory 26, a user interface 27 for accepting user inputs, one or more databases 28 for storing data, and a control module 29 for interfacing with the process controllers 16 via, for example, an Ethernet connection or any other desired wired or wireless communication network 30. The process management system 10 of FIG. 1 also includes an RFID module 31 which may be a detection controller that is part of the RFID tracking system for interfacing with and potentially controlling the antenna systems 14 via, for example, an Ethernet connection or other type of communication network 32. Still further, the command system 12 includes a communication module 33 for communicating with workers and other operators. The communication module 33 transmits data to and receives information from various information user terminals or other interfaces such as a computer station 34, a personal data assistant (PDA) 36, or a headset 38 via a communication antenna 40 or other visual or audio or even tactile interfaces. The terminals or interfaces also may be, for example, a set of lights that change color, may be a tactile device that, for example, vibrates in one or more known or predetermined manners, may be an audio system that provide an audio signal in the form of a speech signal for example, etc., to indicate the existence of proper or improper materials at a particular location for a particular manufacturing or inventory job. However, the communication module 33 may communicate with any other type of user interface using any known wired or wireless communication technologies. Moreover, if desired, the RFID module 31 may be implemented as software run in a processor in the form of edgeware, to preprocess the data received from the antenna systems 14 and/or to control the antenna systems 14.

Generally, the RFID module 31 may be an RFID detection controller 31 that operates to control or energize the antennas 24 to emit RFID detection signals which are received and reflected (in known manners) by RFID tags within the inventory and manufacturing regions 18, 20 and 22. The detection controller 31 receives the signals reflected or emitted by the RFID tags and collected by the antennas 24 and processes these signals to determine the identity of and the precise location of the RFID tags that reflect or emit radiation in response to the detection signals emitted by the antennas 24. The detection controller 31 may control each of the antennas 24 of antenna systems 14 to periodically scan a location or region covered by the antenna 24 to thereby scan an area or region for RFID tags within the coverage area or region of the antenna 24.

Generally, the detection controller 31 may periodically scan each area or region using a phased array antenna system 14 to form a beam and may even steer that beam across the region or multiple different regions using known phased array beam steering techniques. The detection controller 31 may, alternatively or in conjunction, use a triangulation technique based on the RFID signals received at multiple spaced apart antenna elements 24 (either within the same antenna system 14 or different antenna systems 14) to scan an area or region to determine the location or position of each RFID tag within the coverage area of the antennas 14. As these detection techniques are well known, the specifics of these techniques will not be described in detail herein. The detection controller 31 generally operates using these or other detection techniques to resolve the location for each of the one or more detected radio frequency tags to a sub-region (e.g., area or volume) within the coverage area or location that is less than the entire coverage area of the radio frequency antenna 24 or 14, such as to a region or location equal to or less than one square or cubic meter, one square or cubic foot, one square or cubic inch, as examples. Here, each antenna may periodically scan or cover a region that is 5 feet, 10 feet, 20 feet, 30 feet, in radius, for example.

The RFID detection controller 31 (which may be a centralized controller as illustrated in FIG. 1 or which may have a separate controller element associated with each antenna 24 or antenna system 14) may cause the antennas 24 or the antenna systems 14 to scan a two dimension area (such as an area on the floor of the plant) or a three dimensional volume, such as a volume of space around or adjacent to the antennas 24 to resolve locations of RFID tags within two-dimensional areas or regions or to within three dimensional areas or regions. The antennas 24 or antenna systems 14 may be beam steerable antennas and thus emit a detection signal (radiation) in a directional beam, wherein the beam is periodically swept through the coverage region (area or volume) of the antenna 24. RFID tags, when swept over by the high strength portion of the beam, will reflect or emit an RFID tag signal which is then captured or detected by an antenna 24 or an antenna system 14 (typically the antenna or system emitting the beam impinging on the RFID tag). The location and direction of the beam and the amount of time, for example, that it takes for the RFID tag to respond may be used to detect the two dimensional or the three dimensional location of the RFID tag using the detection techniques described above.

However, the antennas 24 or antenna systems 14 may be fixed pattern or fixed beam antennas and thus emit a detection signal (radiation) in a constant direction or pattern that generally remains the same. In this case, multiple spaced apart antennas cover the same region or coverage area or volume. RFID tags, when exposed to the radiation from these antennas, will reflect or emit an RFID tag signal which is then captured or detected by each of the spaced apart antennas 24 or antenna systems 14. The detection controller 31 may then use a triangulation technique to determine the position of each RFID tag based on signals from two or three spaced apart antennas 24 or 14. This technique is also referred to herein as a scanning technique. Thus, the description provided herein of using one or more antennas to scan an area or region of a plant or other building or location includes using beam steered antennas to perform scans (e.g., by operating an electronic beam steerable antenna or a mechanically steerable antenna to sweep over a region), and includes using triangulation techniques based on signals from multiple different fixed or non-steerable antennas, or some combination of both. Of course, other methods of scanning a region to detect RFID tags could be used as well or instead. In any case, the antennas 24 or the antenna systems 14 (also referred to as antennas) may be fixed antennas, may be electronically controllable and steerable phased array antennas, may be mechanically steerable antennas, etc.

In a general sense, the RFID detection controller 31 may use the antenna system 14 or other antennas 24 to detect and track the location and movement of the RFID tagged inputs and outputs within inventory (including indoor and outdoor storage areas) and within the plant to handle or perform inventory management in the inventory stage 20, to control or manage process flows in the manufacturing stages 18a to 18d, and to manage shipping in the shipping stage 21, all in a manner that increases the efficiency of the plant, assures or increases product quality and helps to assure correct material flows within the plant. Beginning in the inventory stage 20, received inputs such as raw materials like paper rolls are tagged with the RFID tags 22 (e.g., mechanically applying the tags) and are stored in an inventory. The storage location of the RFID tagged raw material is recorded and tracked by the command system 12 (and in particular by a tracking controller executed in, for example the processor 25) so that the raw materials can be located in the inventory at any time without the need of a handheld RFID receiver or of a movable receiver on a forklift, for example. In addition, external vendors may tag the raw materials with the RFID tags 22 to further enhance the process by eliminating manual tagging at the plant.

Moreover, when a job order or production run is started, the command system 12 determines which raw materials to use, and notifies the workers of the location of the raw materials in the inventory via information terminals (e.g., the computer station 34, the PDA 36 or the headset 38) based on the RFID tag of these materials so that the correct raw materials can be picked up for the job order. In one case, the amount of raw materials (e.g., the amount of paper of a roll) that can be used for the job order and the amount of raw materials remaining on each such roll are calculated or are tracked by the command system 12 in order to keep the inventory stock up to date. Further, in the subsequent manufacturing stages 18a to 18d, required material inputs and generated material outputs are tagged with the RFID tags 22 for identification and tracking by the command system 12. The command system 12 determines the required inputs and the required process activities to execute the job order at each manufacturing stage, and tracks the movement of the tagged material inputs to ensure that the correct material inputs are received at the correct manufacturing stage at the correct time (i.e., for the particular job order being run). If the wrong material inputs are received at a particular manufacturing step or process by mistake, as detected by the RFID tracking system, then the command system 12 may notify a user in some manner and/or may suspend the process activities in the manufacturing stage until the correct material inputs are in place. The command system 12 may notify a user of the problem via, for example, one of the user interface devices 34, 36, 38 or via lights, alarms etc. disposed at appropriate places in the plant. In this case, the RFID module 31 (also called a detection controller) and the antennas systems 14 and 24 make up a detection system, while the processor 25 may run a tracking controller using and/or including the memory 26, and the database 28 which may, in turn, store inventory and manufacturing item information as discussed below as well as process manufacturing jobs and recipes or manufacturing information defining materials and/or equipment to use in one or more manufacturing jobs.

When the correct material inputs are received or are present at an input to a manufacturing step or process, the command system 12 may direct or enable the process controllers 16 to execute typical or standard process control functions to run and regulate the various process activities (e.g., starting or stopping process machines, running process steps, controlling throughputs, etc.) that are needed to complete the job order or at least that step of the manufacturing process associated with the job order. If needed, the materials output by a particular stage or step of a manufacturing process may be provided with a new RFID tag to identify the existence of these materials in the plant as intermediate products. The command system 12 then tracks and may direct the movement of the generated material outputs (the intermediate products) to the next stage in the manufacturing process 19 so as to be able to detect these intermediate products as inputs to the next processing or manufacturing stage.

Finally, in the shipping stage 21, completed outputs such as finished goods are tagged with new RFID tags or are otherwise associated with existing RFID tags 22 and are held in a loading bay (or alternatively in a finished goods inventory or a staging area). To ensure proper delivery to customers, the command system 12 matches the correct finished goods and the correct shipping amount with that specified by a customer shipping or purchase order (which may be part of a job order or job number). The command system 12 then notifies the workers of the location of the finished goods in the loading bay via information terminals (e.g., the computer stations 34, the PDAs 36 or headsets 38) so that the correct finished goods can be loaded and dispatched to the proper customers. Additionally, the command system 12 may track movement of the finished goods, via the RFID tags on the finished goods, to assure that the correct finished goods are provided to or placed into the correct truck to assure proper delivery of the finished goods for a particular job run or multiple job runs for a particular delivery. Moreover, in some cases, the command systems 12 may assure that the finished goods are loaded into or on a truck (or railroad car, etc.) in a desired order which will assure, for example, that the finished goods to be unloaded first from the truck are be placed in the back (rear) of the truck, for example, while the goods to be unloaded last are placed in the front of the truck, for example (in a rear opening truck).

In any or all of these cases, access programming stored in the memory 26 and executed on the processor 25, as well as, in some cases, the user interface 27, the user interfaces 34, 36 and 38, the communication module 33 and the control module 29 may act as or form parts of an access system that enables a user to access the location information for the RFID tags as stored in the database 28 to affect the inventory or manufacturing process in any of the manners described herein.

Figure 2:
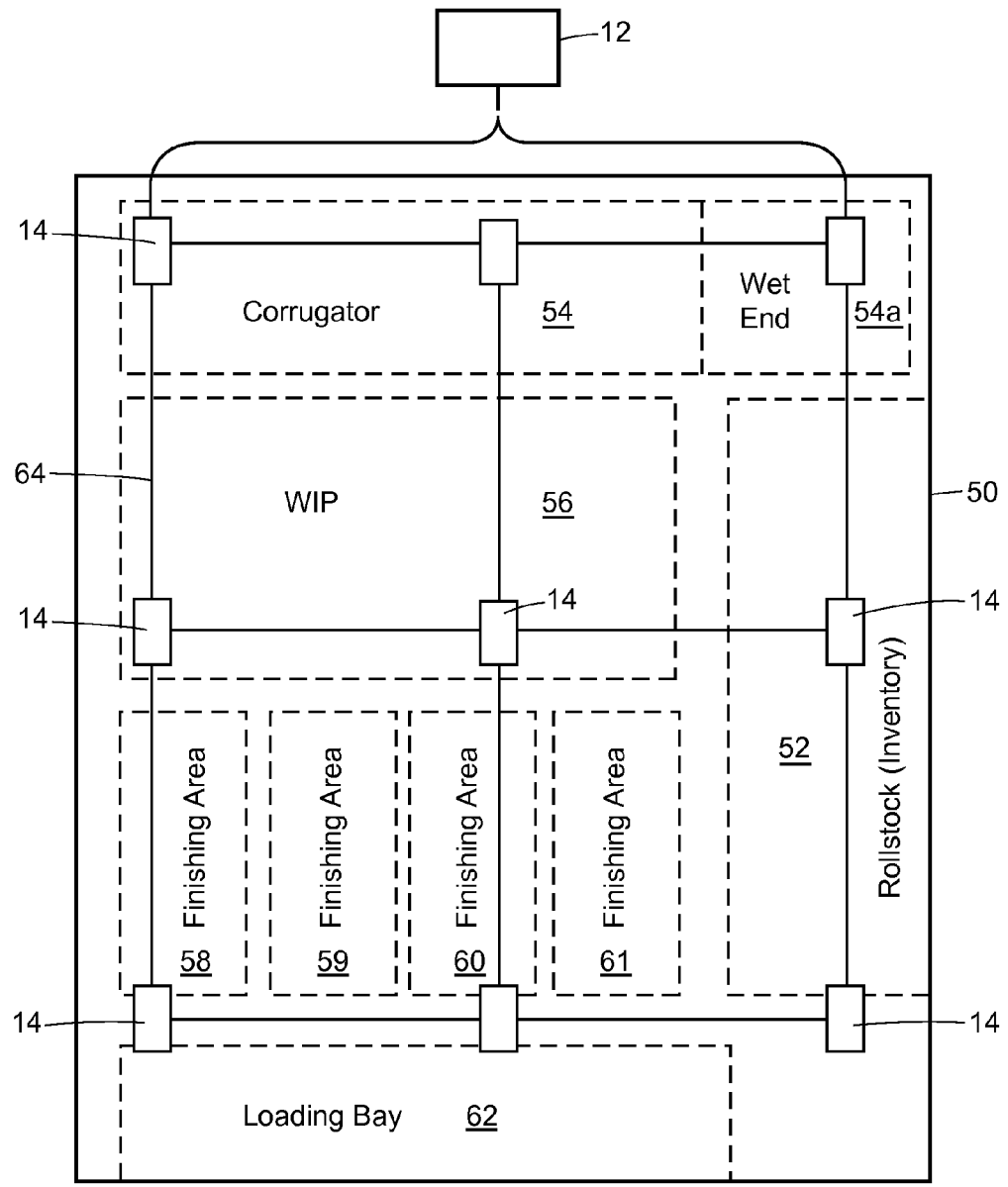
FIG. 2 is a diagram illustrating a manufacturing process used in a corrugated packaging plant in which the inventory and process management system illustrated in FIG. 1 can be used.

FIG. 2 illustrates an example corrugated packaging plant 50 that uses the inventory and process management system 10 to manage a manufacturing process that produces corrugated packaging products. While FIG. 2 describes a corrugated packaging plant, the inventory and process management system 10 in general may be employed in any type of manufacturing process or plant used in the paper industry or outside of the paper industry. The manufacturing process in the corrugated plant 50 is carried out in different areas of the plant 50 including a rollstock area 52, a corrugator area 54 with a wet end area 54a, a work in process (WIP) area 56, finishing areas 58 to 61, and a loading bay area 62. A phased array antenna network 64 is deployed in the plant 50 by, for example, being hung from the ceiling of the corrugated plant 50 to enable the tracking of the location and movement of RFID tagged materials and goods within the plant 50. While FIG. 2 illustrates the antenna network 64 as having nine beam steerable phased array antenna systems 14 arranged in a 3×3 grid layout, the antenna network 64 in general may have any number of antenna systems (phased array or otherwise) arranged in any type of layout or configuration.

Generally speaking, a controller associated with the phased array antenna network 64 is used to electronically steer an energy beam emanated from each of the phased array antennas 14 or to use a triangulation technique on signals from multiple antennas 14 to continuously sweep or scan over an area or volume of the plant floor to thereby provide real-time 3D detection, monitoring and tracking of RFID tagged objects. In particular, during each scan or sweep of an antenna through an area or volume of the plant covered by that antenna, the RFID detection system (that is part of the command system 12) connected to the antenna network 64 may detect each and every RFID disposed within the swept area in a very precise manner (i.e., including very precise x and y horizontal coordinates and in many cases precise z vertical coordinates) and may store the location of each such RFID tag as detected during the scan or sweep. Additionally or alternatively, the phase array antennas 14 may be configured to provide only 2D detection. For example, to speed up processing speeds, the antennas 14 may be configured in a 2D mode to monitor movements in and out of traffic aisles. Moreover, the RFID detection system may detect movement of RFID tags from scan to scan by comparing the current location of the RFID to its previous location. In this manner, the RFID detection system may track the movement of or follow the location of a particular RFID at any time within the plant 50. If desired, the RFID detection system may store a track or a path associated with each RFID tag over time. Moreover, the RFID system may cause each of the separate antennas of the network 64 to periodically scan or sweep over the various locations or regions of the plant 50 at which RFID tags may be located, which may include the entire plant 50, or only certain portions of the plant 50. If desired, the RFID system may scan or sweep over certain plant locations, for example, locations at which RFID tags are likely to move more often or more quickly, such as on the plant floor, in the manufacturing areas of the plant, in the loading bay of the plant, etc., more often or at a higher periodic rate than the RFID system sweeps over other plant locations, for example, locations at which RFID tags are likely to move less often, such as in the inventory storage areas of the plant. Of course, the periodic rate at which the RFID system scan or sweeps over any particular portion of the plant 50 may be set based on the likely speed of movement of RFID tags through that location and the granularity or detection accuracy needed for particular functions to be implemented within the plant based on RFID tracking.

The details of the manner in which the RFID detection and tracking system operate to perform 3D RFID detection by creating and manipulating one or more detection beams using the phased array antenna system 64 and then periodically sweeping those beams over various areas of the plant 50 to perform real-time 3D RFID detection at any location swept by the beam is described in more detail in U.S. Patent Application Publication No. 2010/0207738 and so will not be described in detail herein. In any event, by continuously performing beam sweeping and RFID detection and updating, the RFID system may detect and track the location of any RFID tag in the plant 50 at any desired time. In other words, by periodically sweeping over an area or volume in the plant using one or more of the antennas of the antenna system 64, the phased array antenna network 64 employs a zonal monitoring approach that does not rely on the movement of the RFID tagged objects through a fixed portal or a read node (i.e., stationary RFID readers) and that does not rely on the manual scanning of the RFID tagged objects (i.e., hand-held RFID readers) in order to achieve reliable RFID tag identification and/or to ascertain the location of the tagged objects. Thus, unlike conventional RFID systems, the phased array antenna network 64 can be used to track and monitor the location and movement of tagged materials and goods throughout the corrugated plant 50 at any time, thereby enabling the command system 12 to be able to perform various inventory and manufacturing process control and management functions such as inventory management, process flow management and shipping management more effectively and efficiently.

Generally speaking, to perform the manufacturing tracking, control and management functions described herein, the command system 12 stores a record for each RFID tag in the system with each such record including the RFID tag number (i.e., a unique number or identification associated with the RFID tag) and various information about the material to which the tag is attached or with which the tag is associated. This inventory or manufacturing information may include a type of product or material, a manufacturer of the product or material, characteristics of the product or material (e.g., a type of paint, paper, printing head, etc.) a quantity of the material (e.g., the amount of paper left on a paper roll to which the tag is attached, the amount of ink in a can or bucket to which the tag is attached, etc.), and other types of information. Moreover, if desired, each record may store a current location of the RFID tag within the plant and such locations may be identified in any desired manner. For example, locations stored within these records may be GPS locations or coordinates, may indicate an area or region or sub-region of the plant or a specific location in the plant, etc. that is defined by the plant operator, or may be any other type of location designation used in the plant. The command system 12 may then use these RFID records (the locations of which are being constantly updated by the RFID detection and tracking system) to perform various process, inventory and shipping management or control functions as described in more detail below.

As one example, inventory management is carried out by the command system 12 in the rollstock area 52, where raw materials such as rolls of paper material are received and tagged with RFID tags for cataloging in a rollstock inventory. Of course, the rolls may have an RFID tag associated therewith or applied thereto when these rolls arrive at the plant 50. In this case, a user or personnel at the plant may apply or affix an RFID tag to the roll or other raw material and provide information to the command system 12 so as to the identity of the material (e.g., material type, manufacturer, material quantity, etc.) to be stored as inventory item information in the record for the RFID tag (and its associated identification number) applied to the material. As each roll is placed into the rollstock inventory, the command system 12 may use a tracking controller to track and record the location of each roll in the electronic record of the RFID tag attached to the roll. However, to do this, the RFID system may simply scan the inventory bay periodically and detect the current location of each RFID tag for which a record exists in that area and then update the location fields for the electronic records for those RFID tags.

When a job order or production run designed to produce a particular product is started or implemented within the plant, the command system 12 begins to track or manage that job order using the RFID tags within the plant to assure that the correct raw materials are used in the production run for the job order, to assure that intermediate materials created during the manufacturing steps for the production run for the job order are provided to the correct or to the appropriate machines during the production run when creating the final product, that the machines used to implement the production run for the job order have the correct raw materials (e.g., paper, ink, glue, etc.) provided thereto, equipment (printing plates, etc.) installed thereon, and programming (e.g., printing procedures, banding procedures, etc.) installed or loaded therein, etc. an for assuring that the correct final products are produced and shipped to the customer as called for by the job order or job number.

In the inventory control area, the command system 12, when tracking or implementing a job order, may notify workers which roll or rolls need to be acquired for transfer to the wet end area 54a for the job order and where the rolls are located in the rollstock inventory (e.g., the bay and bin numbers at which the rolls for the job order are located). As the workers pick up the roll and leave the rollstock area 52, the command system 12 can detect movement of the roll via the RFID tag records and can verify that the correct roll is leaving or is being transported on the forklift, for example. If the wrong roll is picked up by mistake, then the command system 12 may alert the worker (via a head set, PDA, etc.) to go back and pick up the correct roll. Of course, once an RFID tag is placed on a roll and is entered into or recognized by the RFID system, no other manual tracking activities (such as bar code scanning) needs to take place to perform this tracking.

As a further example, the command system 12 may operate to detect and track rolls in the wet end area 54a and may detect and indicate whether the correct roll is placed onto the correct roll input or feeder at the wet end of the corrugator machine. Again, the command system 12 may detect an improper roll (for the job to be run on the corrugator machine) being loaded onto a roll feeder of the machine and may notify the operator as such. Additionally, if desired, the command system 12 may send or cause a halt or an interrupt signal to be sent to the corrugator machine (or to the control system controlling the operation of the corrugator machine) to prevent operation of the corrugator machine until the correct roll is loaded onto the feeder. Alternatively, the command system 12 may send an enable signal to enable the operation of the production equipment only when the correct materials are in place for the job order being implemented or run on the equipment. In addition, the command system 12 may determine or calculate how much paper material is used or is removed from the roll (e.g., by tracking the amount of paper used in the corrugator machine) for the job order and thus may calculate the remaining length or amount of paper on the roll and store this length or amount in the electronic record for the RFID tag on the paper roll when the roll is removed from the corrugator machine. The command system 12 may perform this record keeping automatically in order to prevent inventory stockouts and in order to reorder new stock if needed. Moreover, this paper amount, which may be stored in the record for the RFID tag on the roll, may be used in future operations to determine if this roll has enough paper to fulfill a future job order that may use that type of paper. On the other hand, once the job order is completed, any roll with leftover paper material may be tagged with a new RFID tag so that the unfinished roll can be identified and located by the command system 12 for use in future job orders, thereby eliminating waste and reducing cost in the rollstock inventory.

As another example, the command system 12 performs process flow management in the corrugator area 54, the WIP area 56, and the finishing areas 58 to 61 by detecting the movement of tagged materials in these areas. As intermediate products such as stacks of corrugated sheets come off a corrugator machine in the corrugator area 54, RFID tags may be attached to each sheet of paper or to one of the sheets of paper in a particular stack of corrugated paper for identification and tracking by the command system 12. In another case, an RFID tag may be applied to a cart or pallet onto which the stacks of paper from the corrugator machine are placed. In some scenarios, individual sheets may be tagged and processed in which case the RFID tags are attached to individual sheets instead of stacks. The tagged stacks (or paper) may be registered with the command system 12 by having an RFID tag attached thereto and an electronic record created for the RFID tag indicating, for example, the job order or job number for which the stack of corrugated paper was created, the identity or nature of the corrugated stack of paper or any other desirable information. The tagged stack of corrugated paper may then be moved to or placed in the WIP area 56 until needed for further processing. The command system 12 determines from the job order which stack needs to be processed and proceeds to send the correct stack to one of the four finishing areas 58 to 61, either by communicating with a conveyor belt controller to cause the controller to automatically move the stack on a conveyor belt or by notifying workers to manually move the stack. If the workers move the wrong stack by mistake, then the command system 12 may detect the presence of the tagged stack in the wrong area of the process plant (or the presence of an incorrect stack at the input of the machine used for the next stage of production) and alert the workers to go back and move the correct stack to the input.

In some embodiments, different finishing areas may convert the corrugated sheets into different corrugated packaging products. For example, the finishing areas 58 and 59 may convert the sheets into boxes whereas the finishing areas 60 and 61 may convert the sheets into point-of-purchase displays. In other embodiments, all finishing areas may convert the corrugated sheets into one type of product. For example, the finishing areas 58 to 61 may convert the sheets into only boxes or point-of-purchase displays. Depending on the scenario/embodiment, the command system 12 may determine the appropriate finishing area for the stack based on the job order. Once the stack is in one of the finishing areas 58 to 61, the command system 12 determines required process operations (e.g., folding, gluing, die-cutting, printing, banding, etc.) to be performed in the finishing area to convert the stack of corrugated sheets into finished goods (e.g., boxes, point-of-purchase displays, etc.). In addition, for operations such as printing, the command system 12 may determine various process supplies that are required for the operations performed by the various machines in the plant such as paints, inks, printing plates, glues, etc. These process supplies may also be tagged with RFID tags which allow the command system 12 to track and identify which process supplies or plant machine parts are needed for or should be used in a production run for a particular job order or job number. The command system 12 may notify workers to find and assemble the correct process supplies from a process supplies inventory. These actions may include loading or installing the supplies on the correct machine, such as installing dyes on cutting or manufacturing machines, installing printing plates on a printing device, installing paint or ink buckets or cartridges on a printing machine, loading glue into a machine, etc. If the wrong process supplies are assembled or are installed on a machine by mistake, then the command system 12 may detect the presence of the materials having the RFID tags not appropriate for the production run at the locations of the machines to be used for the production run and alert the workers and/or suspend or interrupt the operation of the process (e.g., by automatically halting the operation of the machine) until the workers have found and assembled or installed the correct process supplies. Conversely, the command system 12 may assure that all of the correct materials for a production run for a particular job number by determining that the RFID tags for the correct materials are present at the machines to perform the production run, and then alert workers or halt operations via a controller when some product or material needed for the production run is missing.

When the correct process supplies are in place, the command system 12 may operate or enable process controllers to run process machines and regulate the various process operations needed to generate the desired finished goods by sending enable signals to the controllers for those machines. The finished goods are then tagged with RFID tags for further identification and tracking by the command system 12. In some cases, the same RFID tag as applied to the corrugated sheets may be used to identify the finished goods made from the corrugated sheets. In other cases, new RFID tags may be applied to the finished goods, or to a container or cart on which the finished goods are placed to track the finished goods.

Moreover, as the tagged finished goods approach banding machines near the end of the finishing areas 58 to 61, the command system 12 may determine which banding sequence to use for this set of finished goods based on the job number and may direct the banding machines to deploy the correct banding sequence so that the finished goods are properly banded for dispatch. In this case, the command system 12 may tell the operator of the banding machine which sequence to use, may automatically install or download the correct banding sequence to the banding machine, etc. In some cases, the command system 12 may simply detect the banding sequence that a banding machine is set to use and may halt or interrupt the operation of the machine until the correct banding sequence is installed on the banding machine for the finished goods that are approaching or that are at the input of the banding machine as detected by the command system using the RFID tags on the finished goods. In any or all of these cases, the command system 12 may notify a worker or operator that the incorrect banding sequence is programmed into the banding machine or may instruct the operator or worker as to the correct sequence to use for this set of finished goods.

As a further example, shipping management is handled by the command system 12 in the loading bay area 62, where the tagged and properly banded finished goods are held for delivery to customers. When a customer shipping order is ready, the command system 12 notifies workers which finished goods to acquire, the amount of finished goods to ship, where the finished goods are located in the loading bay, and which loading bay door to use. If the wrong finished goods or the wrong amount of finished goods are acquired or loaded by mistake as detected by the movement of the RFID tags for the goods being loaded onto trucks, then the command system 12 alerts the workers to go back and obtain the correct finished goods or the correct amount of finished goods until the customer shipping order is properly fulfilled. In addition, the command system 12 may instruct the workers to load a truck, via one of the shipping bays, in a particular order to make loading or unloading of the truck more efficient. Of course, in any of these cases, the system 12 may interface with the user via visual displays, such as lights that change color to indicate an error or correct operation, via a display interface such as a PDA, a monitor in the area, etc., via a tactile interface, which may vibrate in various different manners to indicate proper or improper operation or actions, or via audio interfaces in which the system 12 may send an audio signal, which may be an alarm or alert signal, such as a beeping or klaxon sound, or a speech signal or any other type of audio signal, to be played to the user via a speaker, such as a headset worn by the user.

Figure 3:
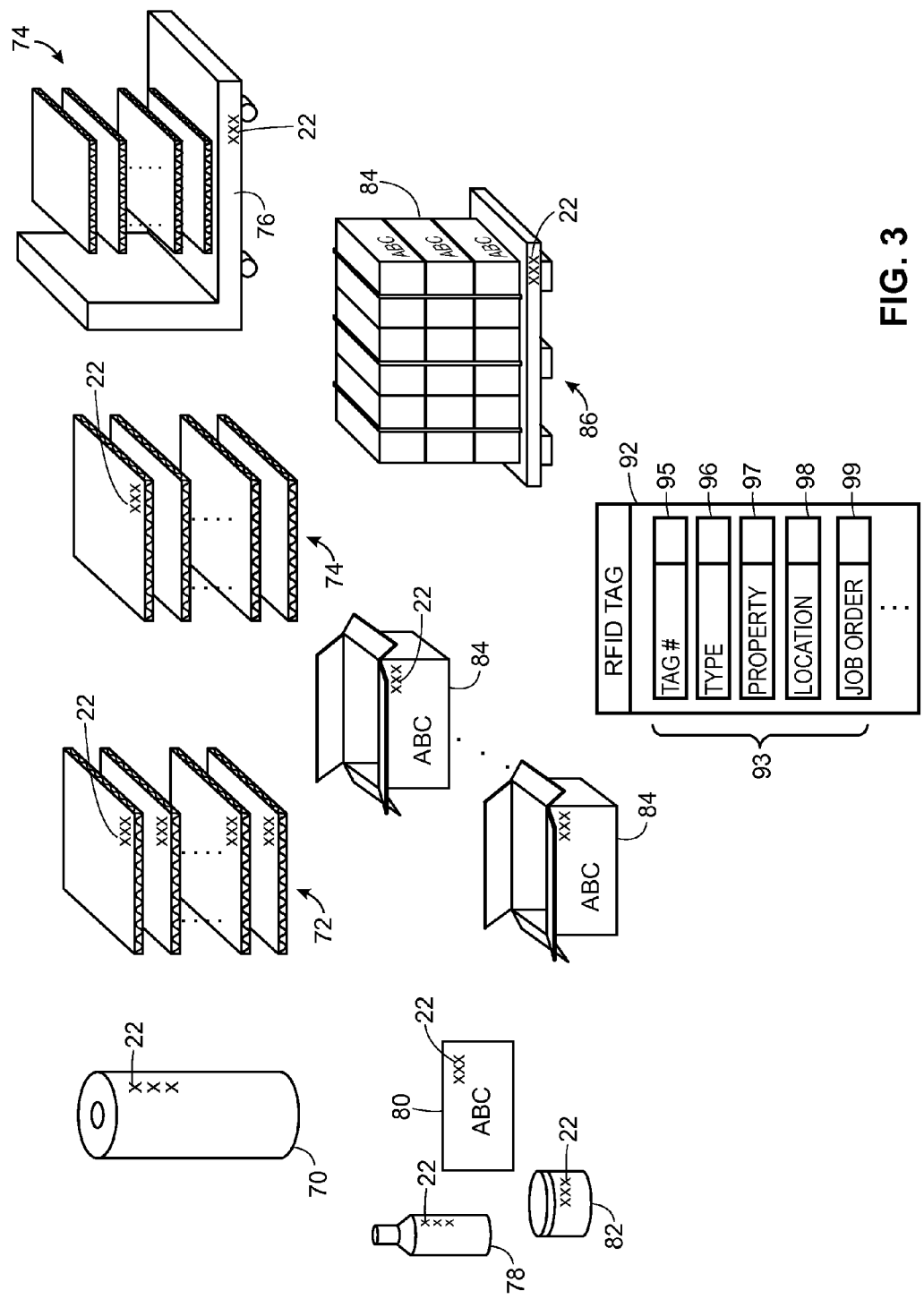
FIG. 3 is a diagram illustrating placement of RFID tags on various objects used in the corrugated packaging plant shown in FIG. 2.

FIG. 3 depicts various materials, goods, or equipment in the corrugated plant 50 that may be tagged with the RFID tags 22. These materials, goods or equipment include, as examples only, raw materials such as a roll of paper material 70; intermediate products such as individual corrugated sheets 72 or a stack of corrugated sheets 74; equipment such as a trolley or cart or pallet 76 carrying a stack of corrugated sheets; process supplies such as a paint supply 78, a printing plate or a dye or any other machine tool 80, or an ink supply cartridge 82; and finished goods such as individual corrugated boxes 84 or a pallet of banded corrugated boxes 86.

Generally speaking, the RFID tags 22 may be any passive or battery assisted passive (BAP) ultra-high frequency RFID tags, which do not have their own power source but instead are excited by energy received from a reader (e.g., the energy beam from the phased array antenna system 64). The passive and BAP RFID tags respond to the reader by modulating data onto some of the received energy and then reradiating the energy back to the reader (the phased array antennas in this case) which in turn decodes the data. Typically, the encoded data will be the RFID tag number, but other data could be encoded or used instead or as well.

FIG. 3 also illustrates an example data structure or electronic record 92 for the RFID tags 22, wherein the record 92, in this case, includes one or more data fields 93 for identifying and locating tagged objects. With reference to FIG. 3, the data structure 92 includes a tag number field 95, a type field 96, a property field 97, a location field 98, and a job number field 99. The tag number field 95 provides a unique identifier for a tag to be stored and categorized in a database. The type field 97 indicates the type of material to which the tag is attached. For example, if the tag is attached to the roll of paper material 70, then the type field may indicate a 'roll', whereas if the tag is attached to the stack of corrugated sheets 74, then the type field may indicate a 'stack'. The type field for a particular RFID tag may change as the material to which the tag is attached or with which the tag is associated changes within the process, e.g., from a stack of corrugated sheets, to a stack of cut box blanks, to a stack or group of printed boxes, to a set of finished goods in the form of a banded stack or group of printed boxes. The property field 97 describes properties or characteristics associated with the type of material indicated in the field 96. For example, for the roll of paper material 70, the property field 97 may indicate the length of the roll or other information that describes the characteristics of the roll.

For the stack of corrugated sheets 74, the property field 97 may indicate the number of sheets in the stack or other information that describes the characteristics of the stack or of the sheets within the stack. Generally speaking, this information may be inventory or material item information that defines the property of the materials. The location field 98 includes location coordinates or other location information for the tag (e.g., location of the tag in the corrugated plant 50) so that the tag can be located and tracked.

Still further, each RFID tag record 92 may include the job number field 99 that stores or indicates the job number to which the RFID tag is currently tied or with which the RFID tag is associated. In some cases, the job number field 99 will be unassigned or blank, such as in the case of RFID tags on paper rolls stored in inventory, printing plates, buckets of paint or ink in storage, etc. However, other RFID tag records 92 may have a job number assigned thereto at the time that the RFID tag is first registered and this job number may remain constant, such as when an RFID tag is applied to the stack of corrugated paper produced by the corrugator machine and then becomes associated with box blanks for the job number and then becomes associated with printed boxes for the job number and then becomes associated with finished goods for the job number. In these cases, the RFID tag may be associated with materials that are uniquely tied to (created for) that job number. In still other cases, RFID tags may have job numbers temporarily assigned thereto, such as the case of an ink or paint bucket, or a printing plate, which may have a job number assigned thereto only while that material is being used on or in a machine or processing step that is performing steps for the job number. At other times, the job number may be unassigned. Although the data structure 92 in FIG. 3 is illustrated as having five data fields, the data structure 92 in general may have any number of data fields to identify and located tagged objects.

Figure 4:
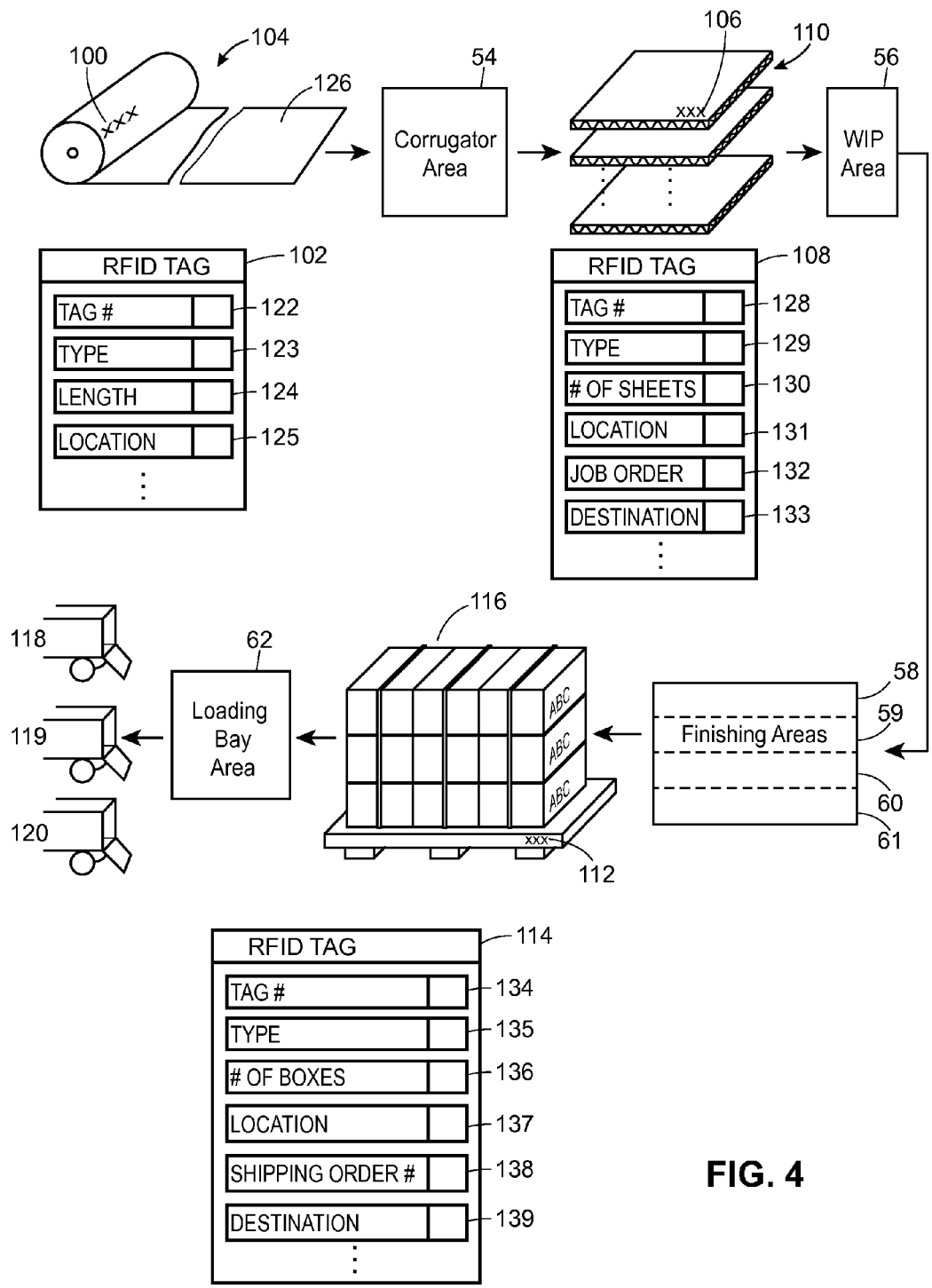
FIG. 4 is a diagram illustrating the use and development of RFID tags and their associated data structures in a manufacturing process of the corrugated packaging plant illustrated in FIG. 2.

FIG. 4 represents an example manufacturing process being carried out in the different areas of the corrugated plant 50 (FIG. 2) including the corrugator area 54, the WIP area 56, the finishing areas 58 to 61, and the loading bay area 62, in which RFID tags (e.g., the RFID tags 22 of FIG. 3) may be attached to materials and the electronic records thereof may be used to identify and track various materials and goods in order to control or manage the process flow in the example manufacturing process. For example, as illustrated in FIG. 4, an RFID tag 100 with an associated data structure 102 is attached to a roll of paper material 104, an RFID tag 106 with an associated data structure 108 is attached to a stack of corrugated sheets 110, and an RFID tag 112 with an associated data structure 114 is attached to a pallet of banded corrugated boxes 116. By attaching the tag 100 to the roll 104, the roll 104 can be identified and located in a rollstock inventory area (e.g., the rollstock area 52 in FIG. 2), and when needed, be brought to the corrugator area 54 for further processing. Similarly, by attaching the tag 106 to the stack 110, the stack 110 can be identified and tracked in the WIP area, and when needed, be directed to one of the finishing areas 58 to 61 for further processing. Furthermore, by attaching the tag 112 to the pallet 116, the pallet 116 can be monitored in the loading bay area 62, and when needed, be located and loaded onto delivery trucks 118 to 120 for dispatch to customers.

RFID tags attached to different objects may have data structures that store different data to identify and locate the objects. For example, the data structure 102 associated with the tag 100 has four data fields including a tag number field 122 that identifies the tag 100, a type field 123 that indicates the tag 100 is attached to a roll such as the roll 104, a length field 124 that describes the length of the roll 104, and a location field 125 that indicates the location of the roll 104 in the corrugated plant 50. The command system 12 may update the length field 124 to reflect any changes in the roll length and thus the length of the roll 104 changes when a quantity of the roll material 126 is used in the corrugator area 54. The command system 12 updates the location field 125 whenever the roll 104 is moved in the rollstock inventory area or transported to and from the corrugator area 54. By tracking the location and movement of the roll 104, the roll 104 can be properly processed in the corrugated plant 50. While the embodiment of the data structure 102 in FIG. 4 is shown with four data fields, in other embodiments, the data structure 102 may have any number of data fields to identify and locate the roll 104.

In another example, the data structure 108 associated with the tag 106 has six data fields including a tag number field 128 that identifies the tag 106, a type field 129 that indicates the tag 106 is attached to a stack of corrugated sheets such as the stack 110, a number of sheets field 130 that describes the number of corrugated sheets in the stack 110, a location field 131 that indicates the location of the stack 110, a job order number field 132 that associates the stack 110 to a job order or production run, and a destination field 133 that shows where the stack 110 should be moved to in the corrugated plant 50. The number of sheets field 130 is useful when verifying if sheets are missing from the stack. The location field 131 is useful for tracking the location and movement of the stack 110, either when the stack is being held in the WIP area or when the stack is being transferred to the finishing areas 58 to 61 for processing. The job order number field 132 allows the stack 110 to be processed in accordance with the proper job order and to be associated with a job order number for identification, while the destination field 133 allows the stack 110 to be moved to a proper staging area in the WIP area 56 and/or one of the proper finishing areas 58 to 61 to complete the processing required for the job order. While the embodiment of the data structure 108 in FIG. 4 is shown with six data fields, in other embodiments, the data structure 108 may have any number of data fields to identify and locate the stack 110.

In a further example, the data structure 114 associated with the tag 112 has six data fields including a tag number field 134 that identifies the tag 116, a type field 135 that indicates the tag 112 is attached to a pallet of banded corrugated boxes such as the pallet 116, a number of boxes field 136 that describes the number of corrugated boxes on the pallet 116, a location field 137 that indicates the location of the pallet 116, a shipping order number field 138 that associates the pallet 116 to a customer shipping order (which may be associated with a job number), and a destination field 139 that shows the destination to which the pallet 116 should be shipped. The number of boxes field 136 is used by workers to verify the correct amount of boxes to be shipped against what is required in the customer shipping order. The location field 137 is used for tracking the location and movement of the pallet 116 in the loading bay area 62 and onto one of the delivery trucks 118 to 120. The shipping order number field 138 along with the destination field 139 allow the pallet 116 to be matched to correct customers and properly dispatched for delivery. Shipping order numbers may be tied to job order numbers in some cases, and may, in fact, be the job order number. While the embodiment of the data structure 114 in FIG. 4 is shown with six data fields, in other embodiments, the data structure 114 may have any number of data fields to identify and locate the pallet 116.

Figure 5:
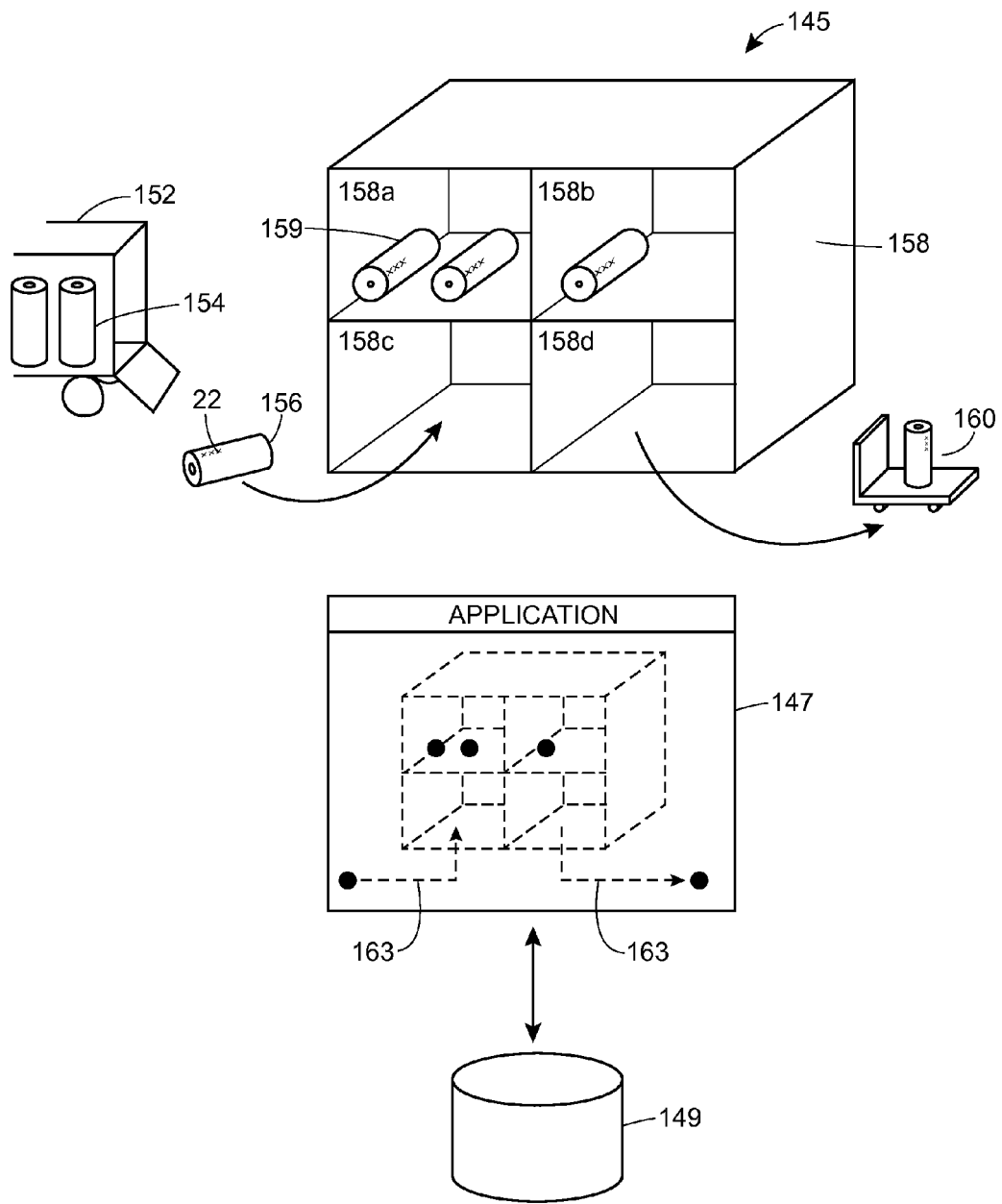
FIG. 5 is a diagram representing an example application that tracks RFID tagged inputs and outputs to manage inventory in the corrugated packaging plant shown in FIG. 2.

FIG. 5 illustrates an example rollstock inventory area 145 in a corrugated plant (e.g., the rollstock area 52 in the corrugated plant 50 in FIG. 2), in which the location and movement of rolls of paper material are monitored in an example application 147 communicating with an inventory database 149. The rollstock inventory 145 includes a delivery truck 152 loaded with one or more untagged rolls of paper material 154, a received tagged roll 156, a storage facility 158 having storage compartments 158a to 158d, each storing one or more tagged rolls 159, and a trolley or forklift carrying a tagged roll 160. As indicated in FIG. 5, the untagged rolls of paper material 154 from the delivery truck 152 are first received and tagged with the RFID tags 22, before being placed in one of the compartments 158a to 158d in the storage facility 158. For example the received roll 156 is tagged before being placed in storage compartment 158c. At the time of tagging, various fields of the electronic record for the RFID tag may be filled out and stored by or within the command system 12 (FIG. 1) to associate the RFID tag with the paper roll (e.g., type, manufacturer, length, etc.). The command system 12 may then detect movement of the RFID tag (using the RFID detection and tracking system described herein) and thus track and store the physical storage location of each tagged roll in the inventory database 149 so that each tagged roll can be located in the storage facility 158 and picked up for subsequent further processing or use.

With reference to FIG. 1, the application 147 may be stored in the memory 26, and executed by the processor 25 of the command system 12. The application 147 may be executed to display an image of the storage facility 158 along with the locations of the RFID tagged rolls in the rollstock inventory 145. Movements of the tagged rolls in (e.g., the received roll 156 going into the storage compartment 158c), and out (e.g., the trolley carrying a tagged roll 61 out of the storage compartment 158d) of the storage facility 158 are shown as dashed lines 163 in the application 147 to provide real-time monitoring of the rollstock inventory 145.

Generally speaking, before the start of a job order or production run, order information is obtained from customers regarding the desired number and type of product to be made, as well as product specifications describing the materials to use, the dimensions of the product, appearances, and other product related information. Upon receiving the order information, workers search through a job order recipe database to determine if a recipe exists for the desired product. If a match is found, then the corresponding recipe or production run may be used as a template for the current job order. The template recipe includes a list of required inputs, required number of manufacturing stages, and required inputs needed at each manufacturing stage in order to produce the finished product. The template recipe also includes a list of intermediate products generated during a manufacturing process, which may be used as inputs to some intermediate manufacturing stages. Of course, modifications can be made to tailor the template recipe to satisfy current needs. For example, if the desired product is to be painted or printed with a different color than the recipe calls for, then the template recipe may be modified to use a different paint or ink color during the painting or inking stage of the manufacturing process. If the workers cannot find an existing recipe in the job order recipe database, then a new recipe may be created in the database for the current job order. The workers will use the order information to define a list of required inputs or materials, required number of manufacturing stages, and any intermediate products that may be generated and used during the manufacturing process. The new recipe for the desired product may also be created by importing and modifying information stored in an existing recipe for a similar product that had been made before. Once the new recipe is created or if a template recipe is selected, a job order number is assigned to identify the recipe and the job order.

The workers then enter a job order number into a command system 12 to commence the job order run or in conjunction with commencing a production run for the job order or job number. Alternatively, the command system may automatically load the job order number. The command system 12 or applications executed by the command system 12 generates or obtains a process flow chart by referencing information in the job order recipe. The flow chart describes the flow of inputs and outputs to and from each manufacturing stage for the job number. By following the flow chart from start to finish, the command system 12 can control or manage the overall process flow in the manufacturing process for the production run or production runs for the job order. For example, at the beginning of the flow chart, the required inputs for the first manufacturing stage are raw materials stored in an inventory. The type of raw materials needed in the first manufacturing stage is determined from the job order recipe. The command system 12 searches an inventory database to find RFID tags associated with the required raw materials for the job order. Once the required raw materials are found in the inventory (and the RFID tags associated with these materials are determined), the command system uses the RFID tags attached to the raw materials to manage the production run. By identifying the RFID tag attached to the raw materials, the location of the raw materials in the inventory can be determined and tracked. Thus, the command system 12 can direct workers to acquire and transfer the needed raw materials from the inventory to the first manufacturing stage by monitoring the movement of the RFID tagged raw materials determined to be used for this production run. Once the location of the raw materials is ascertained to be in the correct place on or at the manufacturing equipment, the command system 12 can proceed to run the manufacturing stage or allow the manufacturing stage to be run by, for example, operating or enabling the process controllers to execute various process activities that are needed to convert the raw materials into intermediate products. As noted above, RFID tags may be attached to the intermediate products such that the command system 12 can track the location and movement of the intermediate products, while at the same time, associate the intermediate products to the job order for further processing.

As the command system 12 proceeds down the flow chart, the required inputs to the subsequent manufacturing stages are determined from the job order recipe. The required inputs may be intermediate products produced from a previous manufacturing stage, and/or process supplies needed to run process activities in the next manufacturing stages. By accessing the electronic record for the RFID tag attached to the intermediate products, the intermediate products can be associated to the correct job order number and thus moved to the appropriate manufacturing stages to ensure a proper process flow in the job order. Additionally, the type of process supplies needed is also determined from the job order recipe. In this case, the command system 12 searches a process supplies database to find the required process supplies needed for a production run for the job order or job number. Once the required process supplies are found, the command system 12 identifies the RFID tag (through the RFID tag number) attached to the process supplies and tracks or determines the location of the process supplies in a process supplies inventory. The command system 12 can then direct workers to acquire, transfer and install the needed process supplies in the appropriate manufacturing stages before running the manufacturing stages to produce more intermediate products or generate the desired finished products.

Of course, at any time, a new RFID tag may be attached to or associated with products produced at any production stage, or an existing RFID tag may be updated to track the location and associate the newly produced intermediate products and/or finished products to the job order for further processing or use. When the command system 12 reaches the end of the production flow chart, the job order is complete (that is, the finished products are now prepared) and the job order number may be matched to a customer shipping order for delivery to the proper customer(s).

Figure 6:
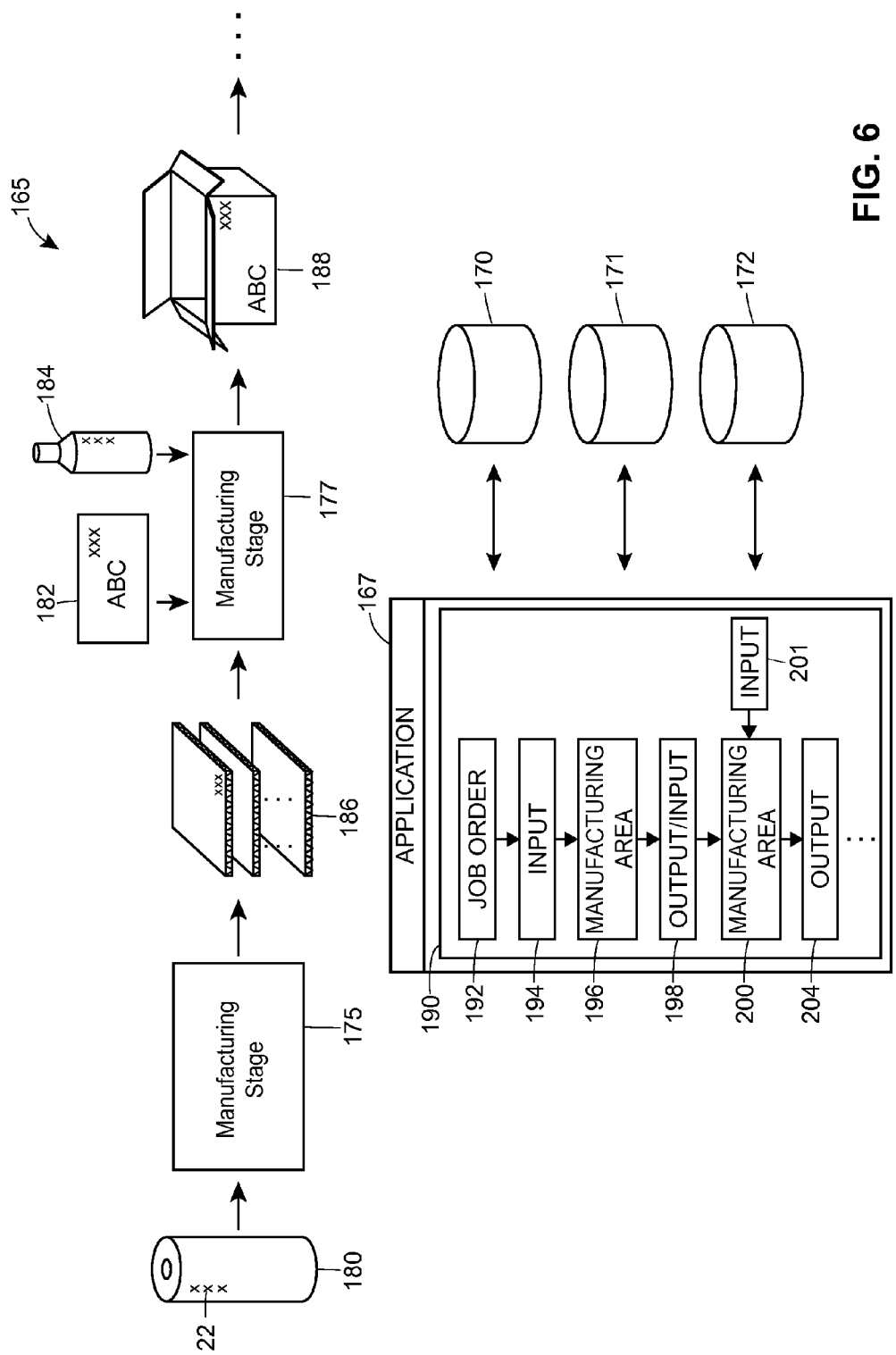
FIG. 6 is a diagram representing an example application that tracks RFID tagged inputs and outputs to manage the process flow in a manufacturing process of the corrugated packaging plant shown in FIG. 2.

FIG. 6 illustrates an example manufacturing process 165 in a corrugated plant (e.g., the corrugated plant 50 in FIG. 2), in which the flow of RFID tagged inputs and outputs is monitored in an example application 167 communicating with a job order recipe database 170, an inventory database 171, and a process supplies database 172, to control the process flow in the manufacturing process 165. The manufacturing process 165 includes one or more manufacturing stages or regions such as a manufacturing stage 175 which may represent the corrugator area 54 in FIG. 2, and a manufacturing stage 177 which may represent one of the finishing areas 58-61 in FIG. 2, and various inputs such as a roll of paper material 180, a printing plate 182, and a paint supply 184, and outputs such as a stack of corrugated sheets 186, and a corrugated box 188 (which could also be a stack or group of corrugated boxes). Some of the outputs may also be used as inputs in the manufacturing process. For example, the output generated from the manufacturing stage 175 (i.e., the stack of corrugated sheets 186) is fed into the manufacturing stage 177 as an input. The inputs and outputs in each manufacturing area are tagged with the RFID tags 22, which allow the location and movement of the inputs and outputs to be tracked and directed so as to control the overall process flow in the manufacturing process 165.

The application 167 may be stored in the memory 26 of FIG. 1 for example, and executed by the processor 25 of the command system 12 in FIG. 1. With reference to FIG. 6, the application 167 displays a process flow chart 190 of the manufacturing process 165, which includes a job order block 192, an input block 194, a manufacturing block 196, an output/input block 198, a manufacturing block 200 having an input block 201, and an output block 204.

The process flow chart 190 is generated when a job order number is entered or received by the application 167 to run a production run for a job order. The application 167 first searches the job order recipe database 170 to retrieve the job order recipe associated with the job order number, which may be created by workers as described earlier. The application 167 then proceeds to build or implement the flow chart 190 using information from the job order recipe such as the required inputs (e.g., the roll 180, the printing plate 182, the paint supply 184) for each required manufacturing stages (e.g., manufacturing stages 175 and 177), the manufacturing stages to implement, the programming or sequences to be implemented at the process stages (e.g., the banding sequence to use at a banding machine, etc.). Once the flow chart 190 is generated, the application 167 proceeds to run the job order automatically by executing the flow chart 190. Alternatively, workers may execute the flow chart 190 manually if desired. In another embodiment, the flow chart 190 describes programming performed by the processor to implement the application 167.

The job order starts at the job order block 192, which shows the job order number that identifies the current job order. Next, the input block 194 may indicate the roll 180 as the required input to the manufacturing block 196 (i.e., the manufacturing stage 175). The application 167 accesses the inventory database 171 to search for the roll 180. Once, the roll 180 is found in the inventory database 171, the RFID tag associated with the roll 180 is identified (through the RFID tag number) so that the application 167 can track or determine the physical location of the roll and direct workers to pick up and transfer the roll to the machine used in the manufacturing stage 175. The application 167 will not execute the flow chart 190 further to run the job order until the roll 180 is properly acquired and staged at the correct location on the manufacturing equipment. When the roll 180 is ascertained to be in the correct location for implementing the current manufacturing stage, as determined by the RFID tracking system which may monitor the movement of the RFID tagged roll from the inventory to the manufacturing stage 175, the application 167 executes the manufacturing block 196 to process the roll by for example, operating process controllers in the manufacturing stage 175 to run a corrugator machine that converts the roll 180 into the stack 186. Of course, in this case, the application 167 may communicate with a controller of the machine to implement the production step, or may remove an inhibit signal from the controller or may otherwise indicate to an operator that the production step can now be properly executed.

After execution of the first processing step in this case being the corrugator machine, the output stack 186 is then shown in the output/input block 198 as the required input to the manufacturing block 200 (i.e., the manufacturing stage 177). An RFID tag may be assigned to the stack 186 to track the location and movement of the stack as well as associate the stack to the current job order. Thus, the stack 186 can be directed to or managed to be delivered to the manufacturing stage 177 for further processing. From the job order recipe, other inputs, for example process supplies such as the printing plate 182 and the paint supply 184, that required for the manufacturing block 200 are determined and are shown in the input block 201. The application 167 then accesses the process supplies database 172 to search for a printing plate 182 and the paint supply 184 in a storage inventory needed for the production run for this job number and may determine the RFID tag associated with these materials. Once the those process supplies are determined in the process supplies database 172, the RFID tags attached to the printing plate 182 and the paint supply 184 are identified (through the RFID tag numbers) so that the application 167 can direct workers to locate, transfer and install the printing plate 182 and the paint supply 184 in the appropriate process machines (e.g., printing machines) in manufacturing stage 177. The application 167 will not execute the flow chart 190 further to run the job order until the stack 186, the printing plate 182, and the paint supply 184 are in the correct locations in the manufacturing stage 177. Alternatively, the application 167 may detect if RFID tags for the correct materials (printing plate, ink, etc.) are present at or on the printing machine already and, if so, may enable the machine to operate. In general, the application 167 determines if the proper materials are at the proper location or directs these materials to the proper locations by tracking the location and directing the movement of the stack 186, the printing plate 182, and the paint supply 184 through their attached RFID tags. Once all of the required inputs are in place, the application 167 can proceed to execute the manufacturing block 200 by for example, operating process controllers in the manufacturing stage 177 to run a folder and gluer machine, a printing machine and other equipment needed to produce the box 188. The generated box 188 is then shown in the output block 204. At this point, an RFID tag may be assigned to the box 188, which can be used to associate the box 188 to the current job order and to locate and transfer the box (through the RFID tag number) to other manufacturing stages in the manufacturing process 165 for further processing or use. If desired, the same RFID tag that was used on the corrugated sheets provided to this stage may be updated (i.e., the record of which may be updated) to reflect that this RFID tag is now associated with printed boxes (made from the corrugated sheets). The application 167 may continue to perform these operations at each manufacturing stage (e.g., the banding stage, and other manufacturing stage) until the set of finished goods for the job order or job number are completed or are made.

Figure 7:
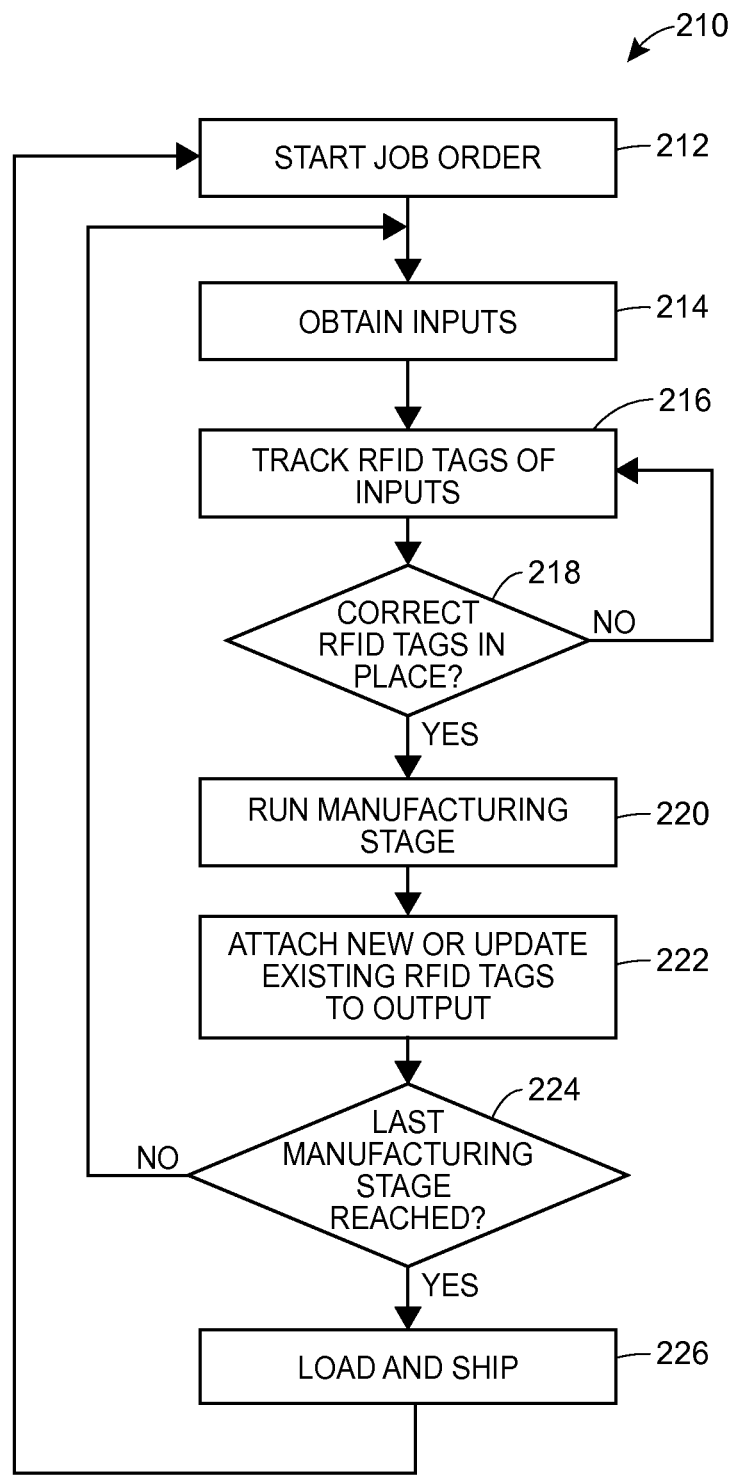
FIG. 7 is a flow chart of an example method that may be implemented by the process management system of FIG. 1 to track RFID tagged inputs and outputs to manage or control a manufacturing process.

FIG. 7 depicts an example flow diagram of a method 210 that may be implemented to manage a manufacturing process by tracking and controlling the flow of RFID tagged inputs and outputs. With reference to FIG. 1, the method 210 may be implemented by one or more computer implemented routines or programs or modules stored in the memory 26, and executed by the processor 25 of the command system 12.

At a block 212, the method 210 receives a job order number to start a job order or production run in the manufacturing process. The method 210 uses the job order number to obtain a job order recipe, which may be created beforehand either from presorted instructions or routines or based on user input, from a database (e.g., the job order recipe database 170). From the job order recipe, the method determines the required inputs and the required type and number of manufacturing stages that are needed to produce the desired outputs for the job order. At a block 214, the method searches through other databases (e.g., the inventory database 171, the process supplies database 172) to find the required inputs (e.g., raw materials, process supplies). Once the inputs are located in the databases, the system determines the RFID tags associated with the inputs needed for the various manufacturing stages of the production run, and may begin tracking these RFID tags to perform process management of the production run for the job order. For example, if the required inputs are raw materials for the first manufacturing stage, then the raw materials are located in an inventory through the attached RFID tag and moved from the inventory to the first manufacturing stage. If the required inputs are intermediate outputs generated from a previous manufacturing stage, then the intermediate outputs are located through the attached RFID tag and directed to move from the previous manufacturing stage to the next manufacturing stage for further processing. Accurate process management of a production run for a job order gives customers, especially in critical industries like medical or food, complete traceability of where and how the product was made, which in turn helps to reduce a manufacturer's liability. At a block 216, the command system 12 tracks movement of the inputs to the correct manufacturing stage by tracking the RFID tags attached to the determined inputs. At a block 218, the method 210 determines if the correct inputs are at the correct manufacturing stage. If the correct inputs are not in place, then the method 210 may notify a user or operator or may take some other step, such as interrupting or halting the operation of the process machine to be used in this manufacturing step for producing the job of the job order or notifying an operator, and returns control to the block 216 to continue tracking the RFID tags. If the correct material inputs are in place in the manufacturing process, then the method 210 runs or allows the manufacturing stage to be run at a block 220 by for example, operating process controllers (e.g., the controllers 16 of FIG. 1) to execute and control various process machines and process steps that are need to generate the desired outputs. Because the command system 12 can track the precise location of the RFID tags (typically to within one square foot or even eight inches) and associate the current job order to the inputs, only those RFID tagged inputs with the proper job order number and placed at the correct places in the manufacturing stage are used. For example, RFID tagged objects (e.g., other potential inputs such as generated intermediate outputs from another job order) near the manufacturing stage will not be used because the objects are not associated with the current job order. Once the method 210 finishes running the manufacturing stage in block 220, the generated outputs may tagged with other RFID tags in a block 222 (or the records for the RFID tags used on the inputs to the previous manufacturing stage are updated to reflect the new intermediate product or finished goods to which the tags are attached) so that the location and movement of the outputs can be tracked and controlled to manage the overall process flow in the manufacturing process.

At a block 224, the method 210 determines if the required number of manufacturing stages for the job order has been executed. If the last manufacturing stage has not been executed, then the method 210 returns to the beginning of block 214 to continue determining the required inputs to run the remaining manufacturing stages. However, if the last manufacturing stage has been reached, then the tagged outputs are prepared for dispatch to customers. At block 226, the method 210 matches the outputs to a customer shipping order for proper loading and shipping to the correct customers. Once customer delivery is made, the job order is complete. Of course, the method 210 returns to the block 212 to start a new job order at any time. Also, the method 210 may be halted for any particular job run and the method may be run simultaneously in the plant for various different job order numbers.

Moreover, to manage shipping, the system may receive a shipping order and use the RFID tracking system to track that the RFID tags on the finished goods associated with the shipping order are placed on the proper truck (e.g., leave the plant via a particular loading bay door which an operator may indicate as the location of the truck in which the finished goods for this shipping order is parked). Likewise, as noted above, the system may automatically produce a bill of landing indicating or listing the finished goods that that were actually placed on the truck as detected by the RFID tracking system and the records for the RFID tags that were detected as being placed on the truck. Still further, the system may determine or manage the order in which various different finished goods are placed onto a truck so as to load the truck in a proper order when a single truck is being used to transport more than one shipping order.

The following additional considerations apply to the foregoing discussion. Throughout this specification, plural instances may implement functions, routines, or operations structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the foregoing discussion that alternative embodiments of the structures and methods illustrated herein may be employed without departing from the principles described herein.

Upon reading this disclosure, those of skill in the art will appreciate still additional alternative structural and functional designs for a process management system and a method that uses an RFID detection and tracking system for managing or controlling process or production operations can be used as well or instead. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. An inventory tracking system for use in tracking placement of physical items within an inventory tracking region, comprising:
   a radio frequency tag detection system including:
      a plurality of radio frequency antennas disposed in a spaced apart manner within the inventory tracking region; and
      a detection controller coupled to the plurality of radio frequency antennas, the detection controller including a beam-steering control system that controls the operation of each of the radio frequency antennas, wherein one of the plurality of radio frequency antennas uses a beam to scan a portion of the inventory tracking region to detect a current physical location of one or more radio frequency tags disposed in a scanned portion of the inventory tracking region, wherein the current physical location corresponds to a position defined by two coordinate units in a multi-dimensional coordinate system and the value of each of the two coordinate units is determined by the one of the plurality of radio frequency antennas, and wherein the detection controller generates indications of the one or more detected radio frequency tags and the current physical locations of the one or more detected radio frequency tags in the scanned portion within the inventory tracking region; and a tracking system coupled to the radio frequency tag detection system to receive the indications of the one or more detected radio frequency tags and the current physical locations of the one or more detected radio frequency tags in the scanned portion within the inventory tracking region, the tracking system including:

a memory for storing inventory item information for each of a plurality of inventory items, the inventory item information for each of the plurality of inventory items including an inventory item radio frequency tag identifier, inventory item identification information defining the identity of the inventory item, and an indication of the current physical location of the inventory item within the inventory tracking region; and an access system that accesses the memory and provides at least a subset of the inventory item information for one or more of the inventory items to a user for determining the current physical location of the one or more of the inventory items within the inventory tracking region, wherein the tracking system updates the indication of the current physical location of at least one particular inventory item within the inventory tracking region as stored in the memory for the at least one particular inventory item based on the indication of the current physical location of the one or more detected radio frequency tags for at least one particular inventory item as produced by the detection controller.

2. The inventory tracking system of claim 1, wherein the subset of inventory item information includes the indication of the current physical location of the one or more of the inventory items within the inventory tracking region.

3. The inventory tracking system of claim 2, wherein the tracking system stores, for each of the plurality of inventory items, inventory item identification information including two or more defining characteristics of the inventory item.

4. The inventory tracking system of claim 2, wherein the inventory item identification information for the at least one of the inventory items includes a type of material associated with the inventory item, a source of the inventory item, or an amount of material associated with the inventory item.

5. The inventory tracking system of claim 2, wherein the access system includes a user display system that graphically displays the current physical location of the one or more of the inventory items based on the indication of the current physical location of the one or more of inventory items.

6. The inventory tracking system of claim 5, wherein the user display system displays the current physical location of the one or more of the inventory items in a graphical manner juxtaposed with an indication of at least a portion of the inventory region.

7. The inventory tracking system of claim 5, wherein the user display system graphically displays the current physical location of the one or more of the inventory items by displaying an indication of a two dimensional geographical location of the one or more of the inventory items within the inventory tracking region.

8. The inventory tracking system of claim 1, wherein the access system includes an auditory system that generates auditory signals based on the current physical location of one or more of the inventory items.

9. The inventory tracking system of claim 1, wherein the access system includes a visual system that generates lighted signals based on the current physical location of one or more of the inventory items.

10. The inventory tracking system of claim 1, further including an inventory control system that receives the current physical location of at least one of the inventory items from the access system and determines if the one of the plurality of inventory items is in a desired location.

11. The inventory tracking system of claim 10, wherein the inventory control system compares the current physical location of the at least one of the inventory items to a desired location of the at least one of the inventory items as defined by a job identifier associated with a job that uses the at least one of the inventory items.

12. The inventory tracking system of claim 11, wherein the inventory control system produces a warning signal when the location of the at least one of the inventory items associated with the job identifier is not at the desired location for the inventory item for the job defined by the job identifier when running the job.

13. The inventory tracking system of claim 11, wherein the desired location is associated with a location of the at least one of the inventory items within a manufacturing process during execution of the manufacturing process during the job.

14. The inventory tracking system of claim 11, wherein the inventory control system detects movement of the at least one of the inventory items based on the job identifier and compares movement of the inventory item with a desired movement of the inventory item as specified by the job identifier.

15. The inventory tracking system of claim 1, wherein the position defined by the two coordinate units in the multi-dimensional coordinate system corresponds to an exact position.

16. The inventory tracking system of claim 1, wherein the position defined by the two coordinate units in the multi-dimensional coordinate system corresponds to a range of positions between two numerical values.

17. A method of tracking inventory within an inventory region, comprising:

periodically scanning the inventory region with one or more radio frequency antennas using a beam steering scanning technique, wherein one of the one or more radio frequency antennas scans a portion of the inventory region to detect one or more radio frequency tags disposed in a scanned portion of the inventory region, each of the one or more radio frequency tags being associated with an inventory item;

determining a current physical location for the one or more detected radio frequency tags in the scanned portion within the inventory region based on the detection of the one or more radio frequency tags within a scan, wherein the current physical location corresponds to a position defined by two coordinate units in a multi-dimensional coordinate system and the value of each of the two coordinate units is determined by the one of the one or more radio frequency antennas, and wherein the current physical location for the one or more detected radio frequency tags is resolved to a region less than the coverage area of any of the radio frequency antennas;

storing, in a computer readable memory, for each of the one or more detected radio frequency tags, inventory item information, wherein the inventory item information for a radio frequency tag includes an inventory item radio frequency tag identifier, inventory item identification information defining the identity of the inventory item, and current physical location information for the inventory item;

updating the current physical location information of at least one inventory item within the inventory region as stored in the computer readable memory based on the determined current physical location of the one or more detected radio frequency tags for the at the least one inventory item as determined during one or more scans; and accessing the stored inventory item information to determine the current physical location of the one or more of the set of inventory items within the inventory region.

18. The method of tracking inventory of claim 17, further including storing, as part of the inventory item identification information, an amount of material associated with the inventory item.

19. The method of tracking inventory of claim 17, further including displaying the physical location of the one or more of the inventory items within the inventory region on a display device.

20. The method of tracking inventory of claim 19, wherein displaying the physical location of the one or more of the inventory items includes graphically displaying an indication of the current physical location of the one or more of the inventory items on a user display device juxtaposed on an indication of at least a portion of the inventory region.

21. The method of tracking inventory of claim 19, wherein displaying the current physical location of the one or more of the inventory items includes displaying at least a portion of the inventory item identification information along with an indication of the current physical location of one or more of the inventory items on a user display device.

22. The method of tracking inventory of claim 17, further including generating a visual alarm signal based on current physical location of one or more of the inventory items.

23. The method of tracking inventory of claim 17, further including using the physical location of one of the inventory items as stored in the memory to determine if the one of the inventory items is in a desired location as defined by a job identifier.

24. The method of tracking inventory of claim 17, including using the physical location of one of the inventory items as stored in the memory to detect movement of the one of the inventory items within the inventory region and determining if the detected movement of the one of the inventory items is a desired movement based on a job identifier.

25. The method of tracking inventory of claim 17, further including enabling or disabling the operation of a portion of a manufacturing process based on the physical location of one of the inventory items.

26. The method of tracking inventory of claim 17, wherein the position defined by the two coordinate units in the multi-dimensional coordinate system corresponds to an exact position.

27. A method of tracking inventory within an inventory region, comprising:

periodically scanning the inventory region with one or more radio frequency antennas using a beam steering scanning technique, wherein one of the one or more radio frequency antennas scans a portion of the inventory region to detect one or more radio frequency tags disposed in a scanned portion of the inventory region, each of the one or more radio frequency tags being associated with a different inventory item;

determining a current physical location for the one or more detected radio frequency tags in the scanned portion within the inventory region based on the detection of the one or more radio frequency tags within a scan, wherein the current physical location corresponds to a position defined by two coordinate units in a multi-dimensional coordinate system, and the value of each of the two coordinate units is determined by the one of the one or more radio frequency antennas, and wherein the current physical location of the one or more detected radio frequency tags is resolved to a region less than the coverage area of any of the radio frequency antennas;

storing inventory item information in a computer readable memory for each of the different inventory items, the inventory item information for a particular inventory item including a radio frequency tag identifier, inventory item identification information defining the identity of the inventory item, and current physical location information for the inventory item;

updating the current physical location information of each of the inventory items within the inventory region as stored in the computer readable memory based on the determined current physical location of the one or more detected radio frequency tags for the inventory items as determined during one or more scans; and enabling access to the stored inventory item information for each of the inventory items to determine the current physical location of the inventory items within the inventory region.

28. The method of tracking inventory of claim 27, further including displaying the physical location of a multiplicity of the inventory items within the inventory region on a display device.

29. The method of tracking inventory of claim 28, wherein displaying the physical location of the multiplicity of the inventory items includes graphically displaying an indication of the current physical location of the multiplicity of inventory items on a user display device juxtaposed on an indication of at least a portion of the inventory region.

30. The method of tracking inventory of claim 27, wherein the position defined by the two coordinate units in the multi-dimensional coordinate system corresponds to a range of positions between two numerical values.

* * * * *